(12) United States Patent
Polyak et al.

(10) Patent No.: US 7,184,992 B1
(45) Date of Patent: Feb. 27, 2007

(54) CONSTRAINED OPTIMIZATION TOOL

(75) Inventors: Roman A. Polyak, Fairfax, VA (US); Igor Griva, Springfield, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 723 days.

(21) Appl. No.: 10/285,461

(22) Filed: Nov. 1, 2002

Related U.S. Application Data

(60) Provisional application No. 60/330,864, filed on Nov. 1, 2001, provisional application No. 60/340,861, filed on Dec. 19, 2001.

(51) Int. Cl.
*G06F 17/00* (2006.01)
*G06N 5/02* (2006.01)
*G06N 5/00* (2006.01)

(52) U.S. Cl. ............ 706/46; 706/45; 706/15; 700/49

(58) Field of Classification Search ............ 706/45–61, 706/15–44; 700/49
See application file for complete search history.

(56) References Cited

U.S. PATENT DOCUMENTS

| | | | | |
|---|---|---|---|---|
| 4,649,351 | A * | 3/1987 | Veldkamp et al. | 359/349 |
| 5,436,940 | A * | 7/1995 | Nguyen | 375/240 |
| 6,334,125 | B1 * | 12/2001 | Johnson et al. | 707/3 |
| 6,424,967 | B1 * | 7/2002 | Johnson et al. | 707/3 |
| 6,859,529 | B2 * | 2/2005 | Duncan et al. | 379/266.1 |
| 2001/0051936 | A1 * | 12/2001 | Michalewicz | 706/46 |
| 2002/0184166 | A1 * | 12/2002 | Jackson et al. | 706/14 |
| 2004/0199481 | A1 * | 10/2004 | Hartman et al. | 706/21 |

OTHER PUBLICATIONS

Irisarri G.D., Wang X., Tong J., Mokhtari S.(1997) Maximum Loadability of Power Systems using Interior Point Non-lLinear Optimization Method. IEEE: Transaction on Power Systems, vol. 12, No. 1, pp. 162-172.*
Kim J.H., Myung H. (1997) Evolutionary Programming Techniques for Constrained Optimization Problems.IEEE:Transactions on Evolutionary Computation, vol. 1, No. 2, pp. 129-140.*
Rao Singiresu. (1996) Engineering Optimization: Theory and Practice. John Wiley & Sons Inc., 3rd Edition.*
Bertsekas, Dimitri. (1999). Constrained Optimization and Legrange Multiplier Methods. Athena Scientifica.*
Roman Polyak, Marc Teboulle, Nonlinear rescaling and proximal-like methods in convex optimization, Mathematical Programming, 1997, pp. 265-284, vol. 76.

* cited by examiner

*Primary Examiner*—Anthony Knight
*Assistant Examiner*—Sunray Chang
(74) *Attorney, Agent, or Firm*—David G. Grossman

(57) ABSTRACT

A system for finding a solution to a constrained optimization problem is disclosed. The system uses a mathematical formulation describing the constrained optimization problem. A transformer builds a specific function using the mathematical formulation, variables; an objective function; at least one constraint; a class of transformation functions with a predefined set of properties; and Lagrange multipliers. The specific function may include a nonlinear resealing part; and an augmented Lagrangian part. An iterative solver uses the specific function, and Lagrange multipliers to generate a solution.

30 Claims, 13 Drawing Sheets

190
lagrange multipliers $$\lambda = (\lambda_1, ..., \lambda_p), v = (v_1, ..., v_q)$$

FIG. 5A

190
lagrange multipliers

↓

260
lagrange multipliers updater

↓

270
updated lagrange multipliers

FIG. 5B $$\hat{\lambda}_i = \lambda_i \psi'(kc_i(\hat{x})), \quad i = 1, ..., p$$

FIG. 5C $$\hat{v}_j = v_j - ke_j(\hat{x}), \quad j = 1, ..., q$$

FIG. 5D

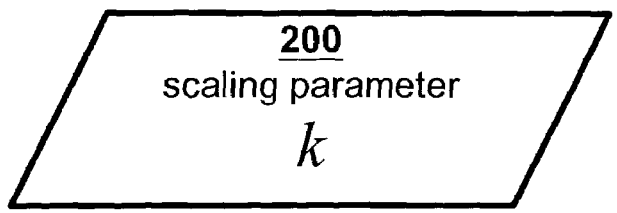
FIG. 6A
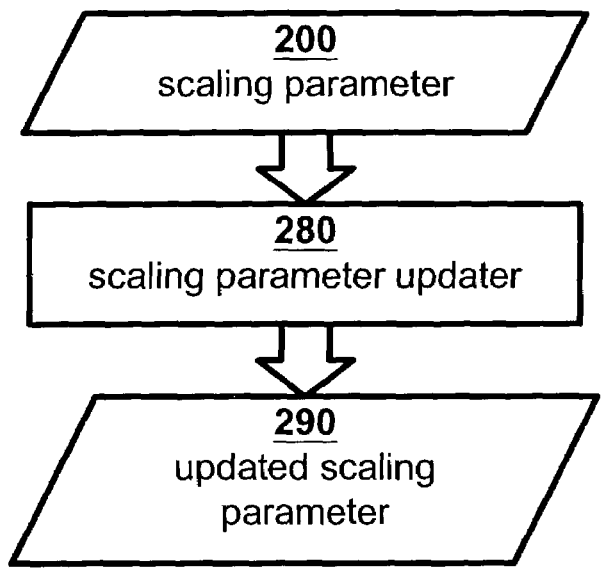
FIG. 6B
$$\hat{k} = \max\{k\gamma, \mu(\hat{x}, \hat{\lambda}, \hat{v})^{-\delta}\}, \quad \delta > 0, \gamma \geq 1$$
FIG. 6C

CONSTRAINED OPTIMIZATION TOOL

CROSS-REFERENCE TO RELATED APPLICATIONS

The present application claims the benefit of provisional patent applications:
a) Ser. No. 60/330,864 to POLYAK et al., filed on Nov. 1, 2001; and
b) Ser. No. 60/340,861 to POLYAK et al., filed on Dec. 19, 2001, entitled "Primal-Dual Modified Barrier Augmented Lagrangian system and method for solving constrained optimization problems", which are hereby incorporated by reference.

BACKGROUND OF THE INVENTION

The present invention relates to the field of constraint optimization. More specifically, the present invention provides for finding optimized solutions of constrained problems using a Nonlinear resealing-Augmented Lagrangian solver.

BRIEF SUMMARY OF THE INVENTION

One advantage of the invention is it may be applied to many different types of constrained problems.

Another advantage of the invention is that it may be implemented in software.

Another advantage of the invention is that it may handle problems with both inequality constraints and equations without transforming one set of constraints into another one.

Another advantage of the invention is that it does not require the unbounded increase of the barrier-penalty parameter to guarantee convergence as it happened in the Interior Point and Penalty type methods.

Yet another advantage of the invention is that it allows to avoid the ill conditioning, i.e. the condition number of the MBAL Hessian is stable when the primal-dual approximation approaches the primal-dual solution. In turn, it keeps stable the area where Newton's method is well defined.

Yet another advantage of the invention is that under the standard second order optimality conditions it converges with Q-linear rate when the barrier-penalty parameter is fixed. The ratio may be made as small as one wants by choosing a fixed but large enough parameter.

Yet another advantage of the invention is that it eliminates the combinatorial nature of constrained optimization with inequality constraints.

Yet another advantage of the invention is that it does not require an interior starting point for constrained optimization with inequality constraints.

To achieve the foregoing and other advantages, in accordance with all of the invention as embodied and broadly described herein, a system for finding a solution to a constrained optimization problem comprising: a mathematical formulation describing the constrained optimization problem; the mathematical formulation including: variables; an objective function; at least one constraint selected from the group consisting of: an inequality constraint; and an equality constraint; a class of transformation functions with a predefined set of properties; Lagrange multipliers; a scaling parameter; a transformer capable of building a specific function from the mathematical formulation, the Lagrange multipliers and the scaling parameter using the class of transformation functions, the specific function further including: a nonlinear resealing part; and a augmented Lagrangian part; a Lagrange multipliers updater capable of calculating updated Lagrange multipliers; a scaling parameter updater capable of calculating an updated scaling parameter; a merit function calculator capable of calculating a merit function; a general stopping criteria verifier; an accuracy of solution parameter; and an iterative solver capable using the specific function, the Lagrange multipliers updater and the scaling parameter updater to generate the solution.

In yet a further aspect of the invention, a method for finding a solution to a constrained optimization problem comprising the steps of: defining a mathematical formulation describing said problem; said mathematical formulation including: variables; an objective function; inequality constraints; and equality constraints; selecting initial Lagrange multipliers; select an initial scaling parameter; selecting initial variables; building a specific function from said mathematical formulation, said Lagrange multipliers and said scaling parameter using an element of a class of transformation functions having a predefined set of properties, said specific function further including: a nonlinear resealing part; and an augmented Lagrangian part; perform a nonlinear resealing augmented Lagrangian iterative algorithm.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 5A is a block diagram of Lagrange multipliers as per an aspect of an embodiment of the present invention.

FIG. 5B is a block diagram of a Lagrange multipliers updater as per an aspect of an embodiment of the present invention.

FIG. 5C is a Lagrange multipliers formula that responds to inequality constraints as per an aspect of an embodiment of the present invention.

FIG. 5D is a Lagrange multipliers formula that responds to equality constraints as per an aspect of an embodiment of the present invention.

FIG. 6A is a block diagram showing a scaling parameter as per an aspect of an embodiment of the present invention.

FIG. 6B is a block diagram of a scaling parameter updater as per an aspect of an embodiment of the present invention.

FIG. 6C is a scaling parameter formula as per an aspect of an embodiment of the present invention.

DETAILED DESCRIPTION OF THE INVENTION

Figure 1:
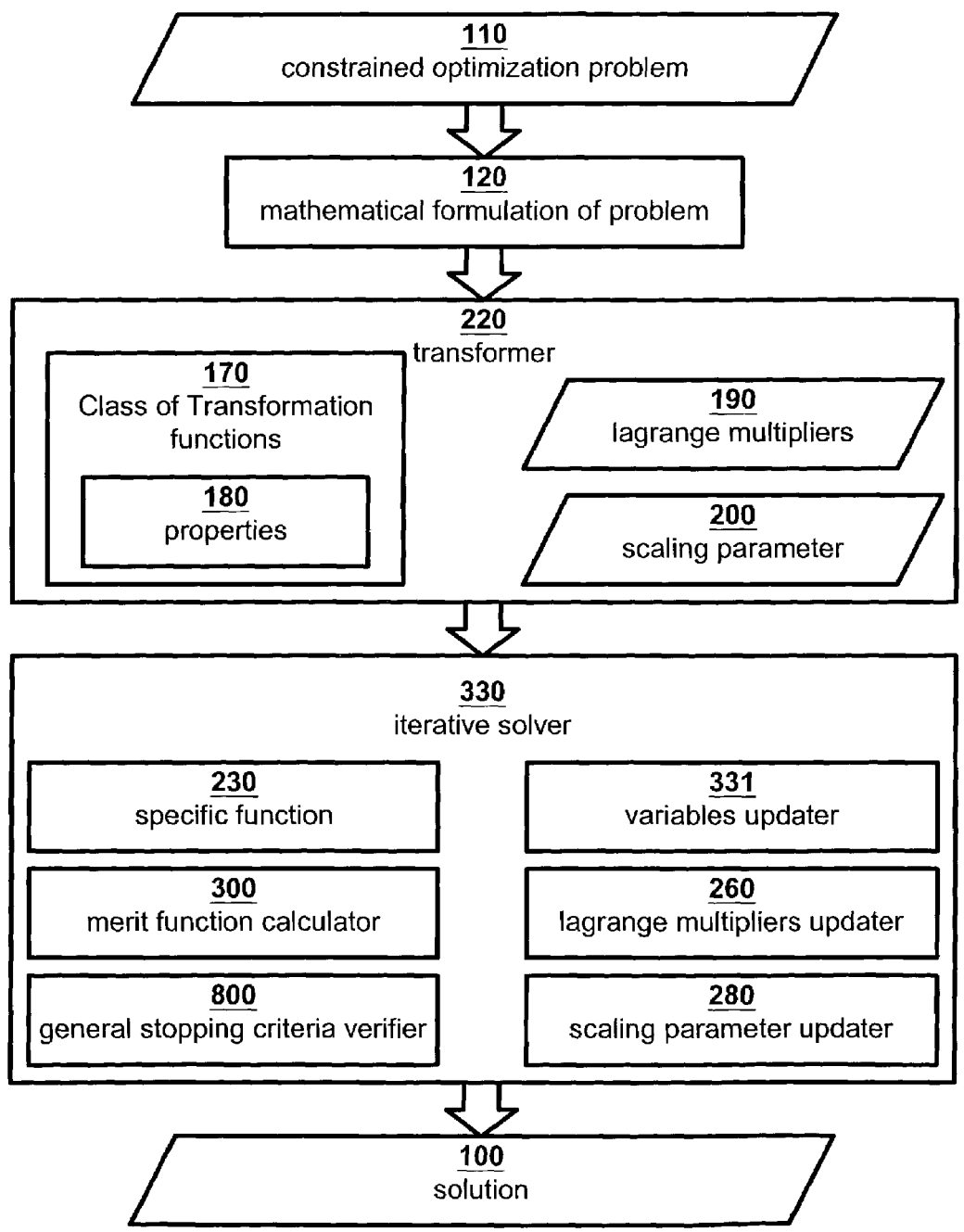
FIG. 1 is a block diagram of a constrained optimizer as per an aspect of an embodiment the present invention.

The present invention is a system for finding a solution 100 to a constrained optimization problem 110. Since most problems have constraints of one type or another, one may realize that many problems may be described as a constrained optimization problem 110. Examples may include power flow problems, image reconstruction problems, pattern recognition problems, data processing problems, network flow problems, optimal control problems, optimal design problems, etc. Further, one skilled in the art will recognize that may other types of problems may be expressed as a constrained optimization problem for which the present invention may be used.

Solution(s) 100 to the constrained optimization problem 110 may be a vector of decision variables that minimize given criteria and satisfy given constraints. The given criteria may be provided as part of the problem description and may describe a preferred outcome. This description is preferably provided as a mathematical formulation 120. For the purposes of the present invention, alternate descriptions may be translated into a mathematical formulation 120.

The system includes but is not limited to: a mathematical formulation 120 describing the constrained optimization problem 110; a class of transformation functions 170; Lagrange multipliers 190; a scaling parameter 200; a transformer 220; a Lagrange multipliers updater 260; a scaling parameter updater 280; a merit function calculator 300; a general stopping criteria verifier 800; an accuracy of solution parameter 320; and an iterative solver 330. One skilled in the art will recognize that aspects of this system may be reproduced using equivalent components or methods. This invention is intended to cover these equivalent embodiments. Further, it may be possible to practice the invention without all of the listed elements. For example, the accuracy of solution parameter 320 is useful in providing input into the system in deciding when a solution is close enough. One skilled in the art will recognize that this function may be built into the system without necessarily needing a parameter.

Figure 2:
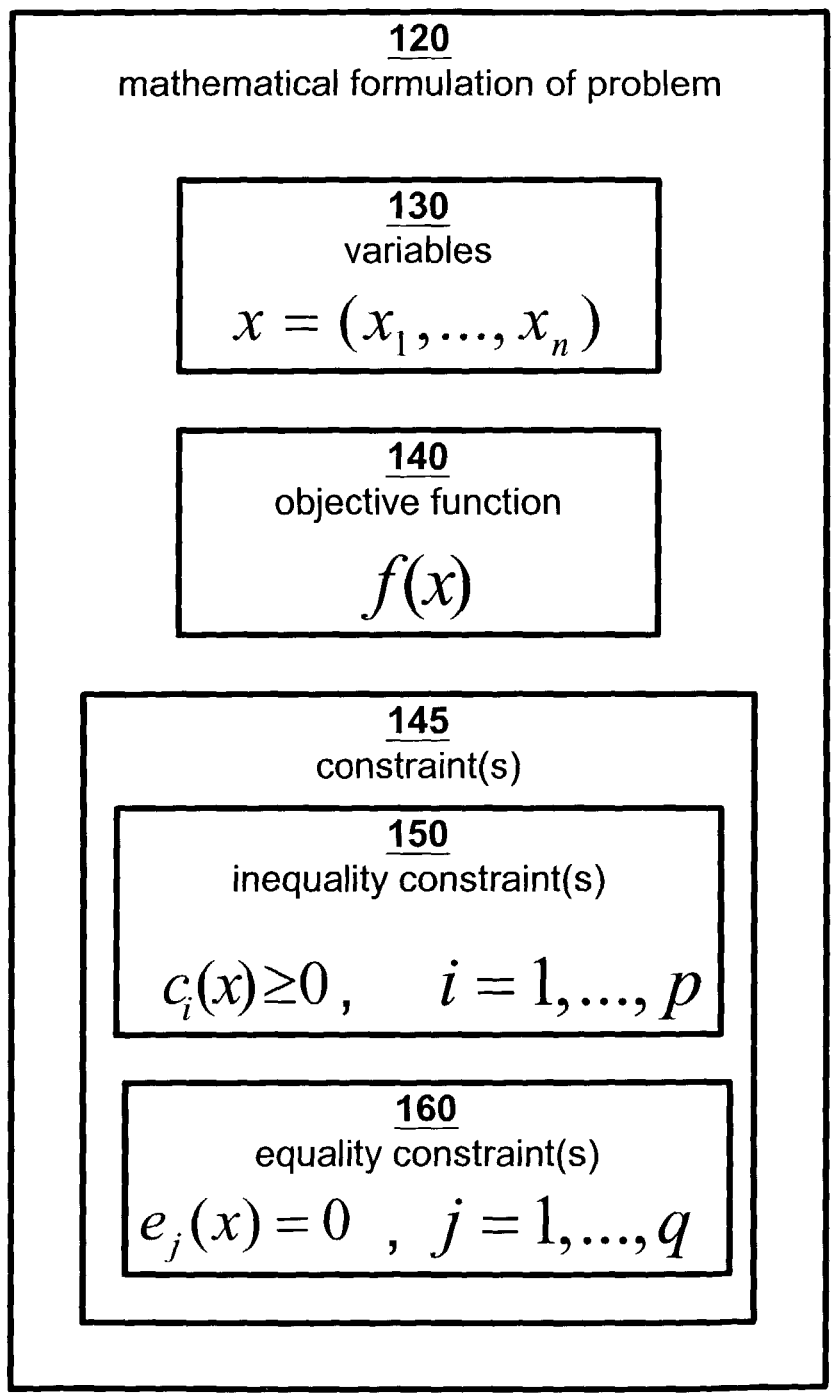
FIG. 2 is a block diagram of a mathematical formulation of a constrained optimization problem as per an aspect of an embodiment of the present invention.

As illustrated in FIG. 2, the system may include a mathematical formulation 120. The mathematical formulation 120 should include an objective function 140 f(x); and at least one constraint 145. The objective function 140 may be a function of many variables. Both the constraint(s) 145 and objective function 140 may depend upon variables 130 $x=(x_1, \ldots, x_n)$. The constraint(s) 150 may further include at least one inequality constraint 150 $c_i(x) \geq 0$, $i=1, \ldots, p$; and/or at least one equality constraint 160 $e_j(x)=0$, $j=1, \ldots, q$. It is possible that problem will only have one constraint 145, or only one type of constraint. For example, for p=0, the problem may have no inequality constraints 150. Similarly, q=0 may result in no equality constraints 160. Further, the mathematical formulation 120 may include the objective function 140 being minimized, subject to the inequality constraints 150 and the equality constraints 160.

One skilled in the art will recognize that much of this disclosure uses notation that should not be construed literally. For example, variables have just been noted as variables x. However, variables could just as easily be noted as variables y, or k, or z.

Figure 3:
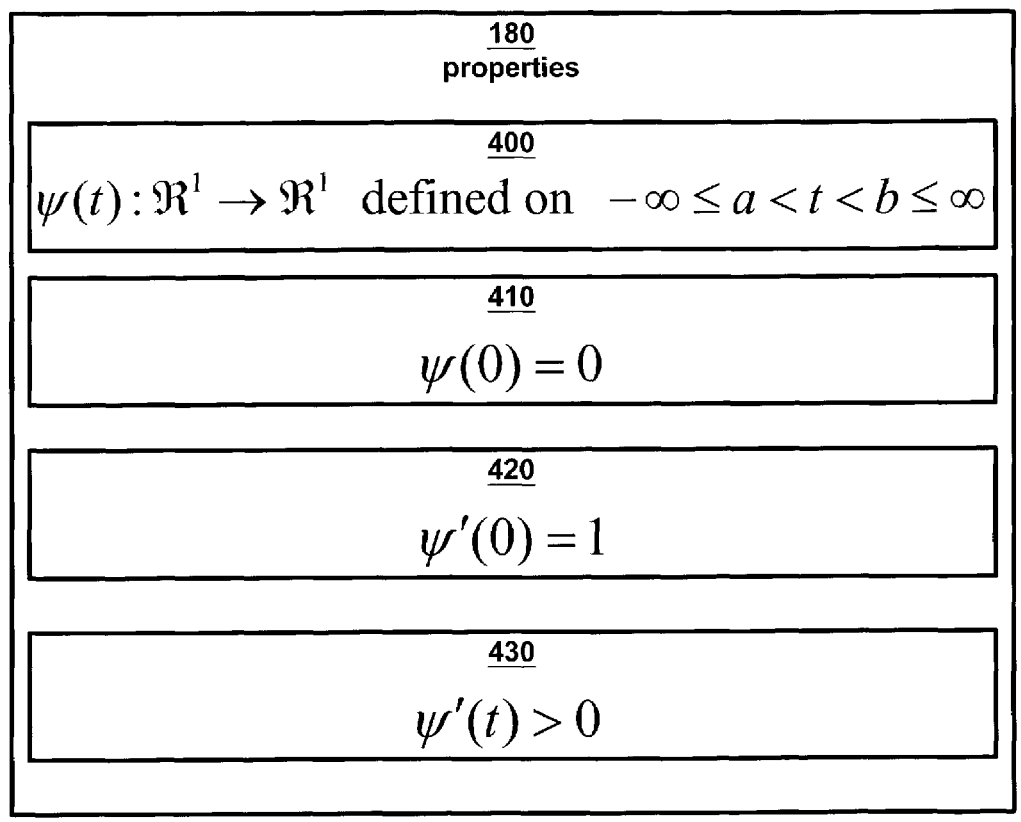
FIG. 3 is a block diagram of transformation function properties as per an aspect of an embodiment of the present invention.

Further, the system may include a class of transformation functions 170 having certain properties 180. Referring to FIG. 3, we may see an example of a transformation function 170 exhibiting properties 180 as per an embodiment of the present invention. Preferably, at least some of the properties will be a predefined set of properties 180. A first predefined property 400 may be that the transformation function is a function of one variable between a and b $\psi(t):\mathfrak{R}^1 \to \mathfrak{R}^1$ defined on $-\infty \leq a < t < b \leq \infty$ 400. Point 'a' may be a negative point or minus infinity and point 'b' may be a positive point or plus infinity. A second property 410 may be that the function passes through zero coordinate $\psi(0)=0$. A third property 420 may be that the slope of the function as it passes through zero be 45 degrees $\psi'(0)=1$. A fourth property 430 may be that the function is increasing $\psi''(t)>0$ 430.

Figure 4A:
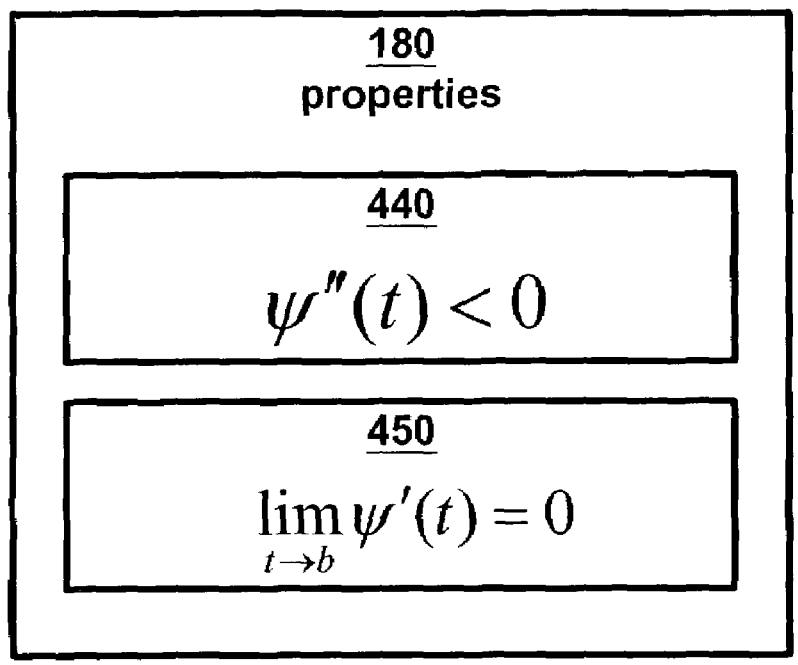
FIG. 4A is a block diagram of additional transformation function properties as per an aspect of an embodiment of the present invention.
Figure 4B:
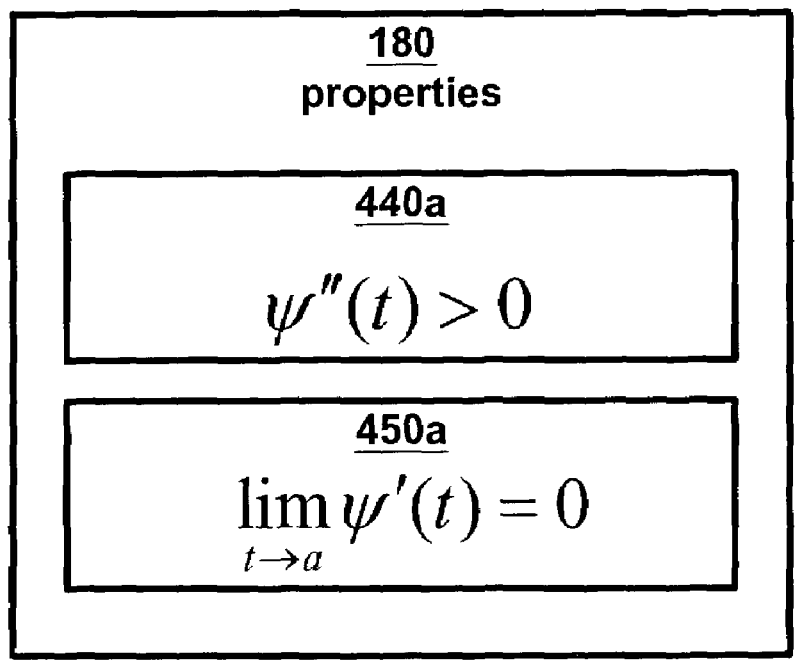
FIG. 4B is a block diagram of additional transformation function properties as per an aspect of an embodiment of the present invention.

FIG. 4A shows a fifth property 440 and sixth property 450. These properties constrain the function to be concave $\psi''(t)<0$; and have a slope of zero at point 'b'. Alternately, the properties are shown in FIG. 4B to respond to an alternative mathematical formulation with the following inequality constraints for 150 $c_i(x) \leq 0$; $i=1, \ldots, p$ of the same problem. The fifth property 440a and sixth property 450a constrain the function to be convex $\psi''(t)>0$; and have with a slope of zero at point 'a'

$$\lim_{t \to a} \psi'(t) = 0.$$

The transformer 220 preferably builds a specific function 230 $L(x,\lambda,v,k)$ from the mathematical formulation 120, the Lagrange multipliers 190 and the scaling parameter 200 using the class of transformation functions 170. The specific function 230 may then depend upon variables 130, Lagrange multipliers 190 and the scaling parameter 200. The specific function 230 preferably has a nonlinear resealing part 240 and a augmented Lagrangian part 250. The specific function 230 may include $$f(x) - k^{-1} \sum_{i=1}^{p} \lambda_i \psi(kc_i(x)) - \sum_{j=1}^{q} v_j e_j(x) + 0.5 \sum_{j=1}^{q} k e_j^2(x)$$

The scaling parameter 200 k maybe a singular 1 dimensional scaling variable. Although the present invention is described using a single scaling parameter, in fact, a system as per this invention may use many scaling parameters or no scaling parameters. In the case of using many scaling parameters, it is possible that a separate scaling parameter could be used for each and every inequality and/or equality constraint. The use of a scaling factor may be totally dependent upon the specific implementation, and/or the power of the solving system.

FIG. 5A shows Lagrange multipliers 190 $\lambda=(\lambda_1, \ldots, \lambda_p)$ $v=(v_1, \ldots, v_q)$ which are multi-dimensional parameters. Multipliers $\lambda=(\lambda_1, \ldots, \lambda_p)$ may respond to inequality constraints. Similarly, $v=(v_1, \ldots, v_q)$ may respond to equality constraints. As shown in FIG. 5B, the Lagrange multipliers updater 260 capable of calculating updated Lagrange multipliers 270 $\hat{\lambda}=(\hat{\lambda}_1, \ldots, \hat{\lambda}_m)$, $\hat{v}=(\hat{v}_1, \ldots, \hat{v}_q)$ from Lagrange multiplier 190. In some embodiments, it is possible for updated Lagrange multiplier 270 to be used as Lagrange multipliers 190, especially when the Lagrange multiplier updater 260 is used in an iterative solver 330. The Lagrange multipliers updater 260 may include Lagrange multipliers update formulas 500. FIG. 5C is an example from a best embodiment of an update formula for the Lagrange multipliers 190 which respond to inequality constraints. Similarly, FIG. 5D shows an example from a best embodiment of an update formula for the Lagrange multipliers 190 which respond to equality constraints.

FIG. 6A is a block diagram showing a scaling parameter as per an aspect of an embodiment of the present invention. FIG. 6B is a block diagram of a scaling parameter updater as per an aspect of an embodiment of the present invention. The scaling parameter updater 280 which may generate an updated scaling parameter 290 from a scaling parameter 200. In some embodiments, it is possible for an updated scaling parameter 290 to be used as a scaling parameter 200, especially when the scaling parameter updater 280 is used in an iterative solver 330. The scaling parameter updater 280 may include a scaling parameter update formula. FIG. 6C is an example from a best embodiment of a formula for updating a scaling parameter 200.

Figure 7A:
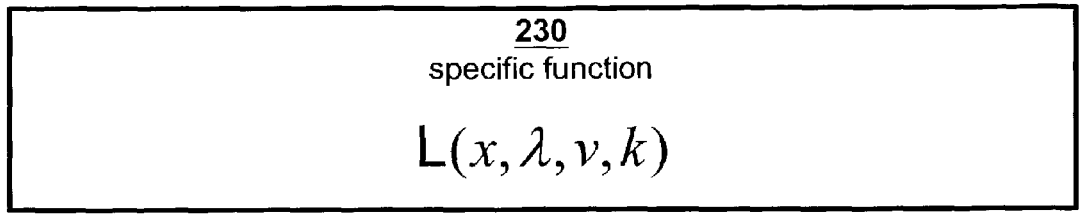
FIG. 7A is a block diagram showing a specific function as per an aspect of an embodiment of the present invention.
Figure 7B:
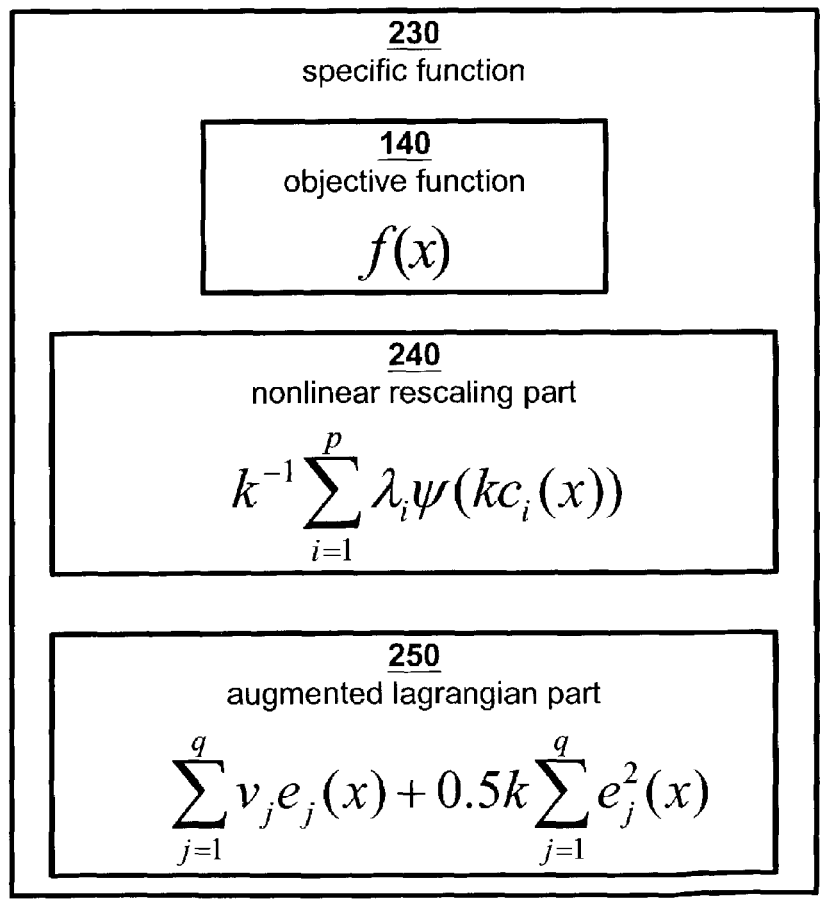
FIG. 7B is a block diagram showing parts of a specific function as per an aspect of an embodiment of the present invention.

FIG. 7A is a block diagram showing a specific function as per an aspect of an embodiment of the present invention. The specific function 230 may depend upon variables 130, Lagrange multipliers 190 and scaling parameter 200. FIG. 7B is a block diagram showing parts of a specific function as per an aspect of an embodiment of the present invention. The specific function 230 preferably includes the objective function 140, and has a nonlinear resealing part 240 and a augmented Lagrangian part 250. The nonlinear resealing part 240 may includes $$k^{-1} \sum_{i=1}^{p} \lambda_i \psi(kc_i(x))$$

and the augmented Lagrangian part 250 may include $$-\sum_{j=1}^{q} v_j e_j(x) + 0.5 \sum_{j=1}^{q} k e_j^2(x).$$

Figure 8A:
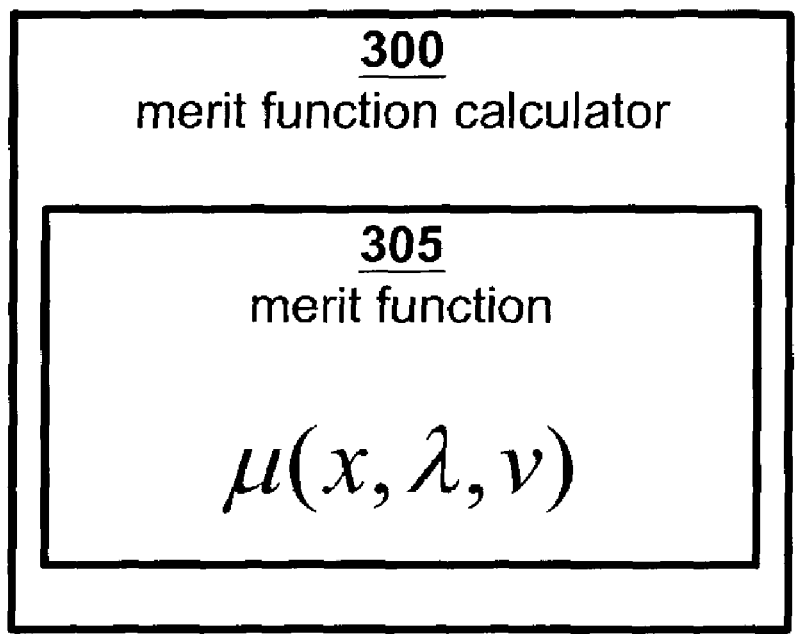
FIG. 8A is a block diagram showing a merit function calculator as per an aspect of an embodiment of the present invention.
Figure 8B:
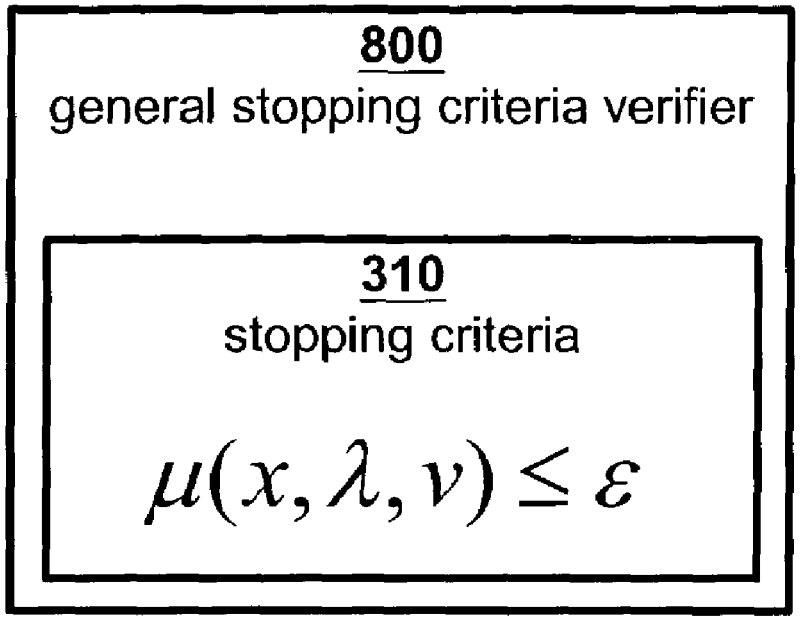
FIG. 8B is a block diagram showing an accuracy of solution parameter as per an aspect of an embodiment of the present invention.

FIG. 8A is a block diagram showing a merit function calculator as per an aspect of an embodiment of the present invention. The merit function calculator 300 preferably uses a merit function 305 $\mu(x,\lambda,v)$ dependent upon variables 130, and Lagrange multipliers 190 to calculate a merit value. FIG. 8B is a block diagram showing a general stopping criteria verifier 800 as per an aspect of an embodiment of the present invention. The general stopping criteria 800 may be used in determining when the iterative solver 330 should terminate and may use an accuracy of solution parameter. The general stopping criteria verifier 800 may compare the merit function 305 against the accuracy of solution parameter to decide when solution is accurate enough. The general stopping criteria 310 may consider whether the merit function 305 is equal or less than the accuracy of solution parameter. The scaling parameter updater 280 may also use the merit function 305.

Figure 9:
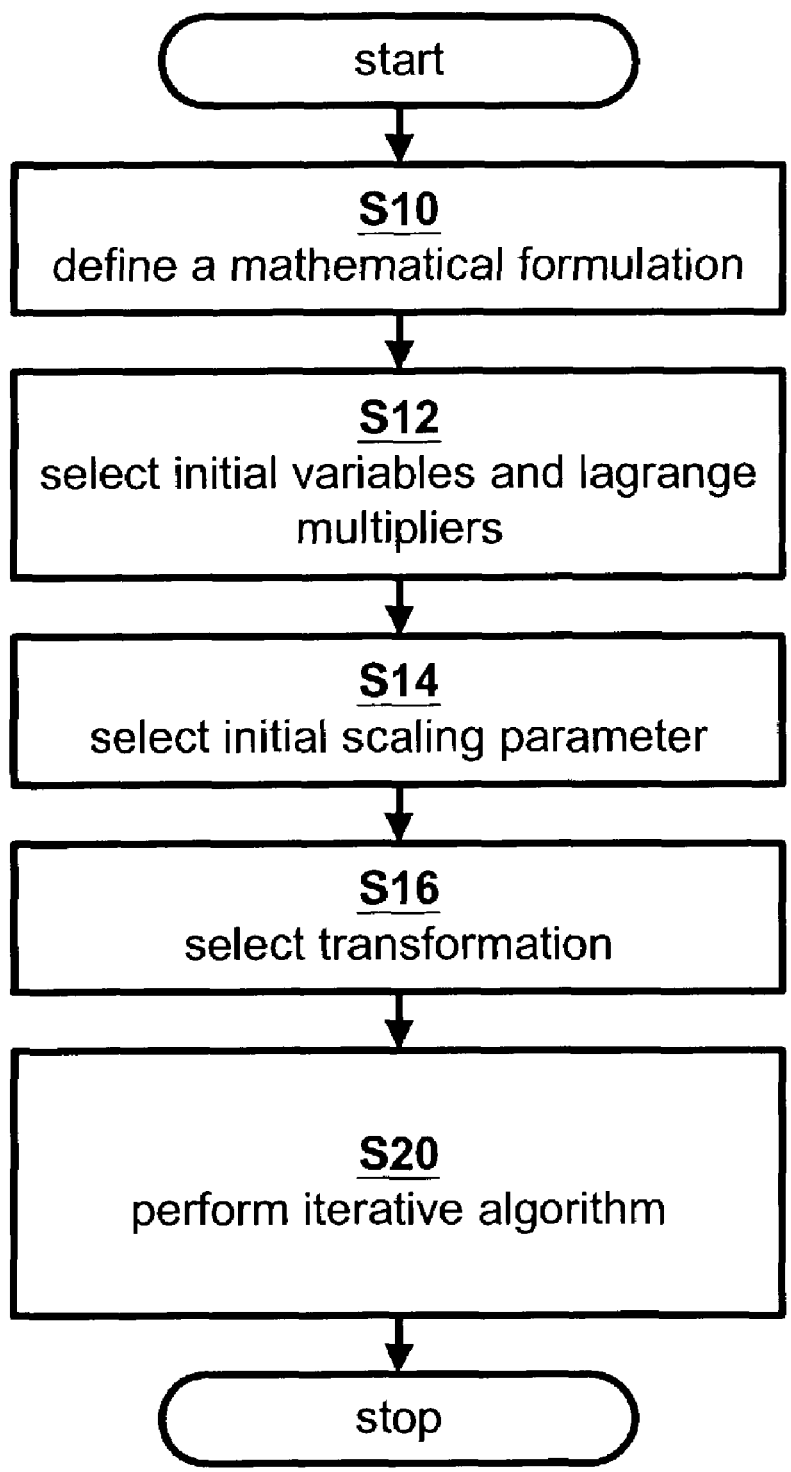
FIG. 9 is a flow diagram of a of a constrained optimizer as per an aspect of an embodiment of the present invention.

A constrained optimization problem 110 may be solved using the present invention by the method shown in FIG. 9. At step S10, a mathematical formulation 120 describing the constrained optimization problem 110 may be generated. The mathematical formulation 120 may include variables 130, an objective function 140, inequality constraints 150, and equality constraints 160. Next at step S12, initial variables 130 and Lagrange multipliers 190 may be selected. An initial scaling parameter 200 k may be selected at step S14, and transformation functions 170 may be selected at step S16.

A specific function 230 may them be built at step S18 from the mathematical formulation 120, the Lagrange multipliers 190, and the scaling parameter 200 using an element of a class of transformation functions 170 having a predefined set of properties 180. The specific function 230 may further include a nonlinear resealing part 240; and a augmented Lagrangian part 250. At step S20, a nonlinear resealing augmented Lagrangian iterative algorithm may be performed.

Figure 10:
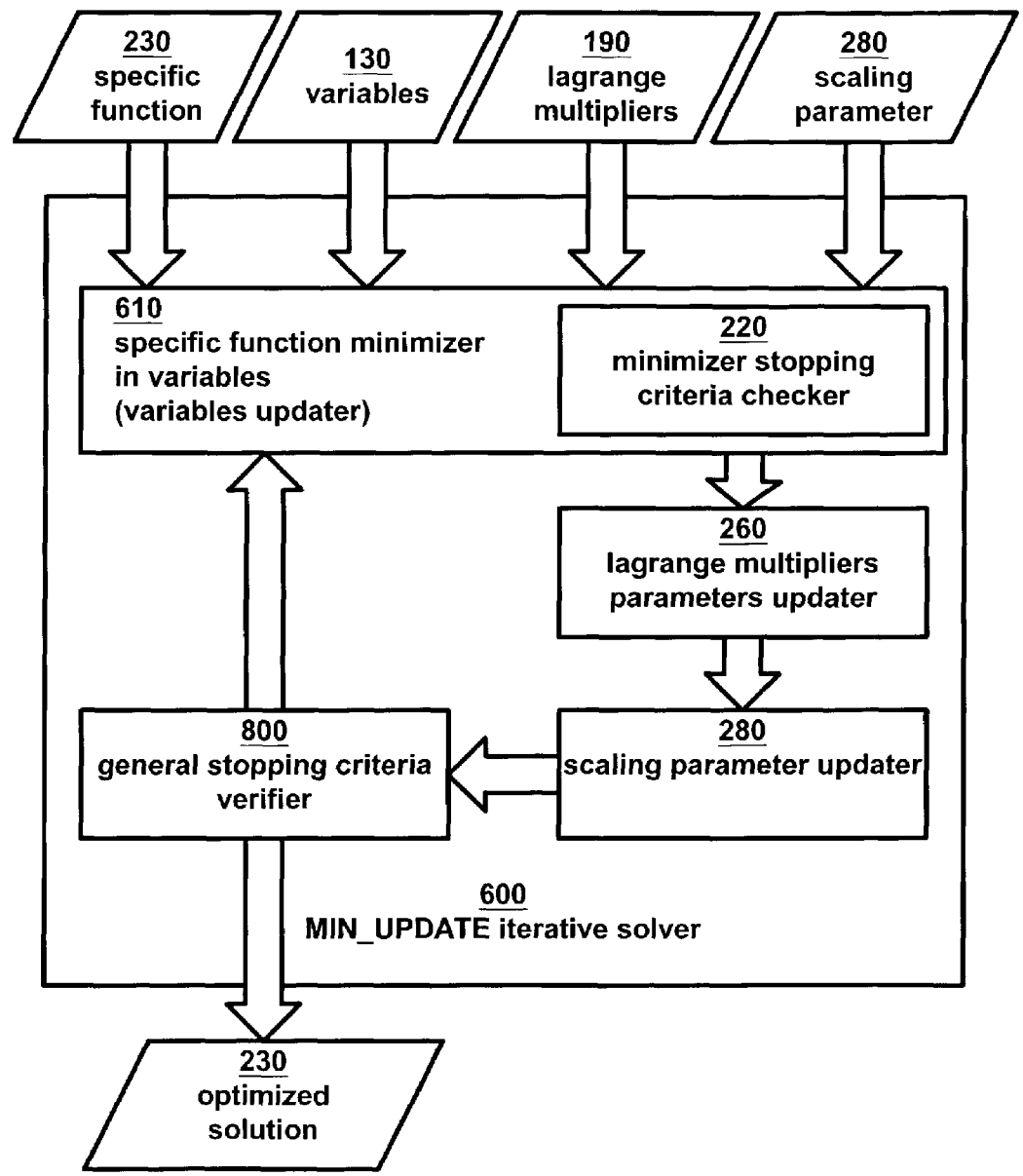
FIG. 10 is a block diagram of a MIN_UPDATE iterative solver as per an aspect of the present invention.
Figure 11:
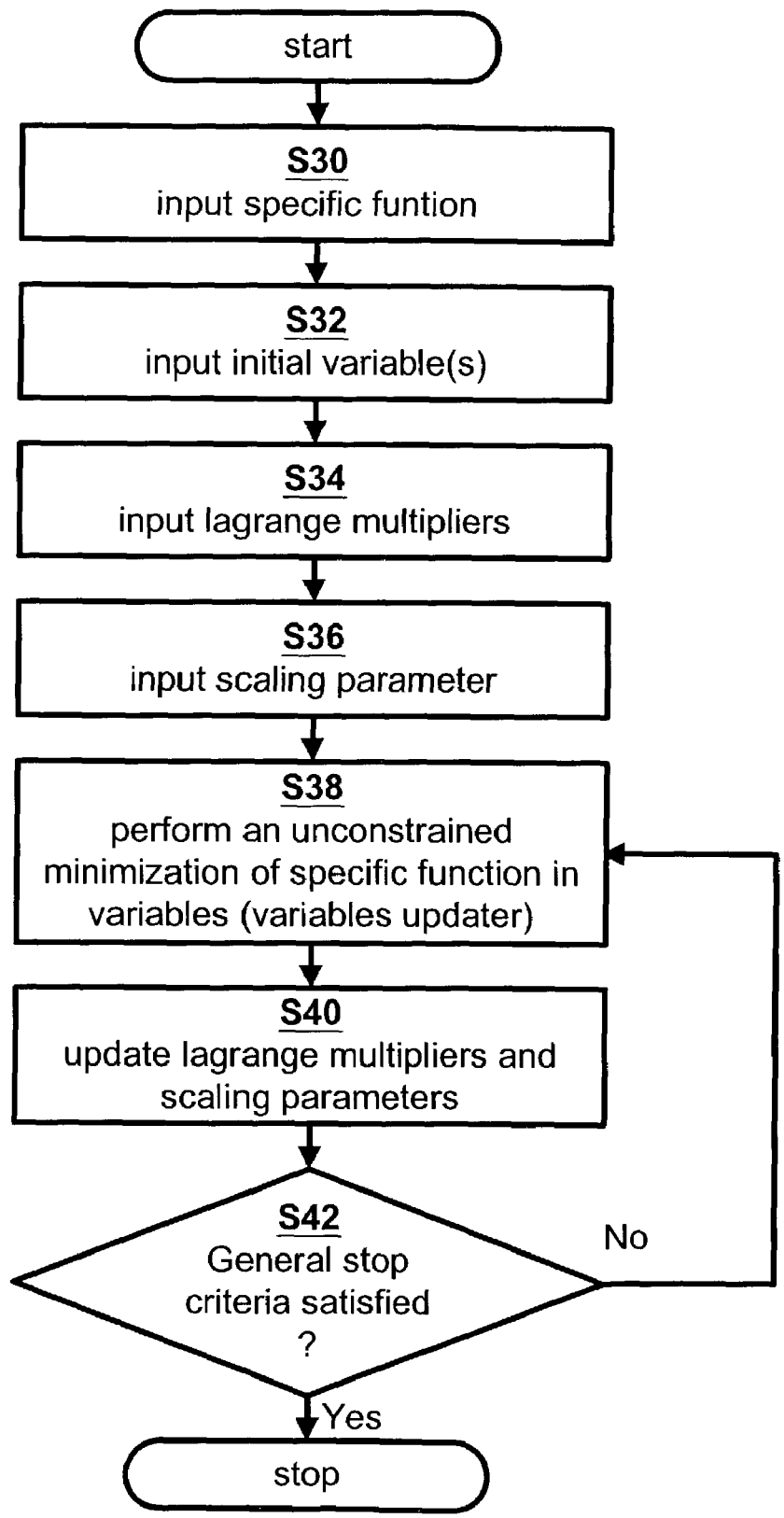
FIG. 11 is a flow diagram of a MIN_UPDATE iterative solver as per an aspect of an embodiment of the present invention.

The iterative solver 330 may be a MIN_UPDATE solver 600. FIG. 10 is a block diagram of a MIN_UPDATE iterative solver 600 as per an aspect of the present invention. FIG. 11 is a flow diagram of a MIN_UPDATE iterative solver as per an aspect of an embodiment of the present invention. This MIN_UPDATE iterative solver 600 is a best mode iterative solver 330. At step S30, a specific function 230 may be inputted into a specific function minimizer in variables device 610. At step S32, initial variables 130 may be inputted into the specific function minimizer in variables device 610. At step S34, initial Lagrange multipliers 190 may be inputted into the specific function minimizer in variables device 610. At step S36, a scaling parameter 280 may be inputted into the specific function minimizer in variables device 610.

Next, at step S38, the specific function minimizer in variables device 610 preferably performs an unconstrained minimization of the specific function 230. This minimization may keep occurring until a minimizer stopping criteria checker 220 decides that the minimization has satisfied a minimizer stopping criteria 630. The minimizer stopping criteria 630 may uses an accuracy of minimizer parameter. The updated variables ($\hat{x}$) may need to satisfy the minimizer stopping criteria 630. Parameters may then be updated at step S40 by a Lagrange multipliers parameter updater 260 and a scaling parameter updater 280. The minimizer stopping criteria 630 may use updated variables 620, Lagrange multipliers 190, scaling parameter 200, updated Lagrange multipliers 270, or a stopping inequality verifier 650 when making its' determination.

At step S42, a general stopping criteria verifier 800 may make a determination as to whether the parameters and variables satisfy a general stop criteria. The general stopping criteria verifier 800 may use updated variables 620, updated Lagrange multipliers 270, or a stopping criteria 310 when making its' determination. If the determination is negative, then the updated Lagrange multipliers 270 and the updated scaling factor 290 may be input to the specific function minimizer in variables device 610 for another iteration. If the determination is positive, then the optimization may end and an optimized solution 230 outputted.

Figure 12:
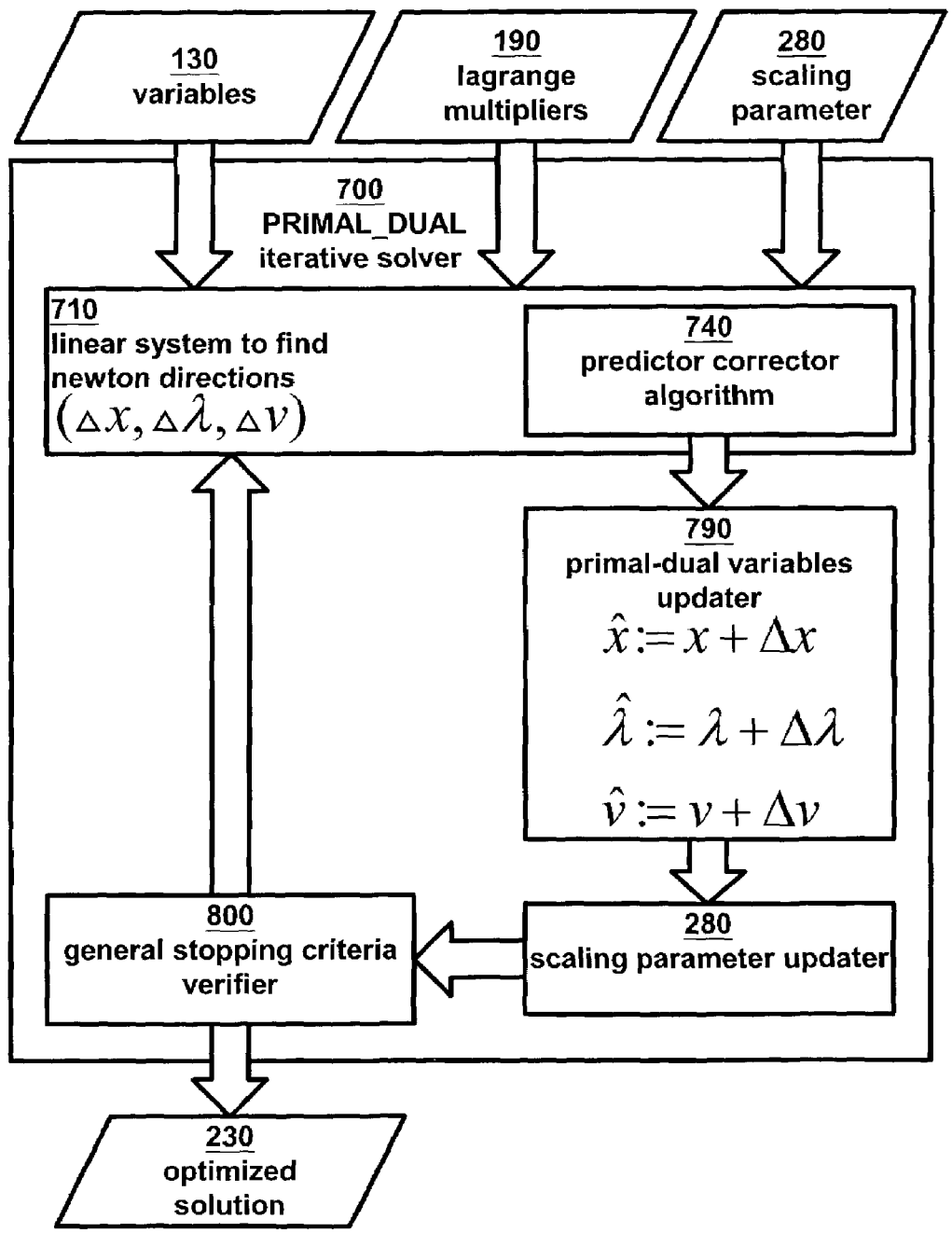
FIG. 12 is a block diagram of a PRIMAL DUAL iterative solver as per an aspect of the present invention.
Figure 13:
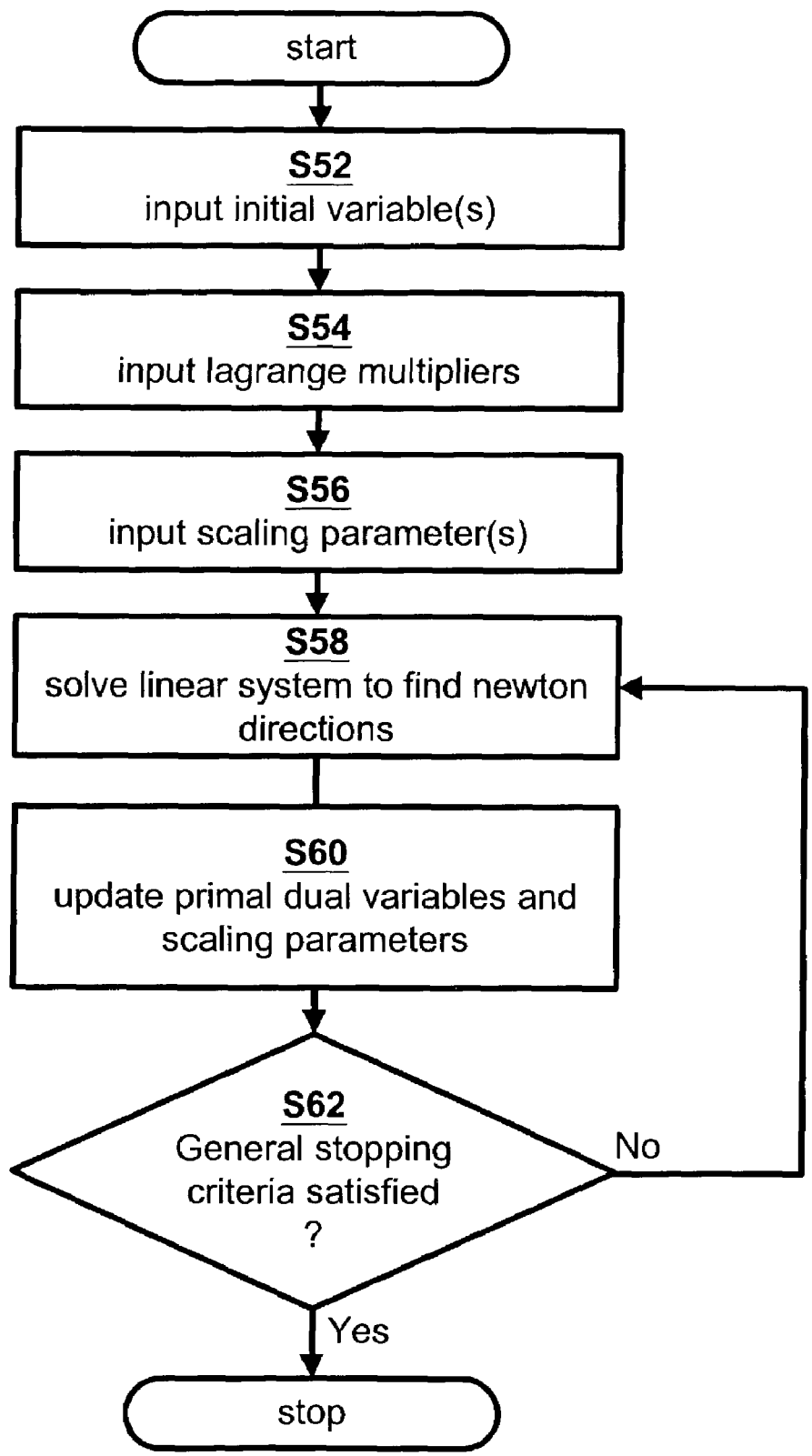
FIG. 13 is a flow diagram of a PRIMAL DUAL iterative solver as per an aspect of an embodiment of the present invention.

The iterative solver 330 may be a PRIMAL DUAL iterative solver 700. FIG. 12 is a block diagram of a PRIMAL DUAL iterative solver 700 as per an aspect of the present invention. FIG. 13 is a flow diagram of an PRIMAL DUAL iterative solver 700 as per an aspect of an embodiment of the present invention. This PRIMAL DUAL iterative solver 700 may include a primal-dual system of equations which may also include a gradient of classical Lagrangian and Lagrange multipliers update formulas. Variable together with Langrange multipliers may be alternatively be called primal dual variables. Further, the gradient of classical Lagrangian may equal zero. At step S52, initial variables 130 may be input to a linear system to find Newton directions 710. The linear system to find Newton directions 610 may be implemented in hardware or software. Next at step S54, largrange multipliers 190 may be input to the linear system for Newton directions device 710. A scaling parameter 280 may be input to the linear system for Newton directions device at step S56.

The linear system to find Newton directions 710 may then solve the linear system at step S58. A predictor corrector algorithm 740 may be used to help solve the linear system for Newton directions. The predictor corrector algorithm 740 may use inequality predictors ($\bar{\lambda}$), equality predictors ($\bar{v}$), a primal corrector ($\Delta x$), a primal linear system, inequality correctors ($\Delta \lambda$), equality correctors ($\Delta v$), and/or a primal-dual updater.

Parameters may then be updated at step S60 by a primal dual updater 790 and a scaling parameter updater 280. Then, at step S62, a general stopping criteria verifier 800 may make a determination as to whether the parameters and variables satisfy a general stopping criteria. If the determination is negative, then the updated Lagrange multipliers 270, updated variables 130, and the updated scaling factor 290 may be input to the linear system for Newton directions device 710 for another iteration. If the determination is positive, then the optimization may end and an optimized solution 230 outputted.

A mathematical explanation of a nonlinear resealing-augmented Lagrangian solver (MRALS) as per the present invention will now be disclosed as. Let $f(x)$, $c_i(x)$, $i=1, \ldots, p$ and $e_j(x)$, $j=1, \ldots, q$ are smooth enough functions. Constrained optimization problem with both inequality and equality constraints consists in finding a solution of the following primal problem (mathematical formulation)

$$f(x^*)=\{f(x)|c_i(x) \geq 0, i=1, \ldots, p; e_j(x)=0, j=1, \ldots, q\} \quad (1)$$

The classical Lagrangian associated with problem (1) may be given by the formula:

$$L(x, \lambda, v) = f(x) - \sum_{i=1}^{p} \lambda_i c_i(x) - \sum_{j=1}^{q} v_j e_j(x) \quad (2)$$

where $\lambda=(\lambda_1, \ldots, \lambda_p)$ is a vector of the Lagrange multipliers associated with inequality constraints and $v=(v_1, \ldots, v_q)$ is a vector of the Lagrange multipliers associated with equality constraints.

Along with the primal problem (1), the present invention also considers the dual problem for $y=(\lambda,v)$ $$d(y^*)=\{d(y) \equiv d(x,\lambda)|\lambda_i \geq 0, i=1, \ldots, p\} \quad (3)$$

where $$d(y) = d(\lambda, v) = \inf_x L(x, y)$$

is the dual function.

The present solver may solve both the primal (1) and the dual (3) problems. Let $-\infty \leq a < 0 < b \leq \infty$. we consider a class class $\Psi$ of twice continuously differential transformation functions, which satisfy the following properties:

i) $\psi(t): \Re^1 \to \Re^1$ defined on $-\infty \leq a < t < b \leq \infty$
ii) $\psi(0)=0$
iii) $\psi'(0)=1$
iv) $\psi'(t)>0$
v) $\psi''(t)<0$ and
vi)

$$\lim_{t \to b} \psi'(t) = 0.$$

The functions $\psi \in \Psi$ we use to transform inequality constraints of a given constrained optimization problem into equivalent set of constraints.

Let us consider a few examples $\psi \in \Psi$.

Logarithmic Modified Barrier Function (MBF): $\psi_1(t)=\ln(t+1)$,

Hyperbolic MBF:

$$\psi_1(t) = \frac{t}{t+1}.$$

Each of above transformations may be modified in the following way. For a given $-1 < \tau < 0$ a quadratic extrapolation of the transformations 1–2 may be defined by formulas.

A third example may be described by:

$$\psi_{qi}(t) = \begin{cases} \psi_i(t), & t \geq \tau \\ q_i(t) = a_i t^2 + b_i t + c_i & t \leq \tau \end{cases},$$

where $a_i$, $b_i$ and $c_i$ may be found from the following equations: $\psi_i(\tau)=q_i(\tau)$, $\psi'_i(\tau)=q'_i(\tau)$ and $\psi''_i(\tau)=q''_i(\tau)$. Equations $a_i=0.5\psi''_i(\tau)$, $b_i=\psi'_i(\tau)-\tau\psi''_i(\tau)$, and $c_i\psi_i(\tau)-\tau\psi'_i(\tau)+0.5\tau^2\psi''_i(\tau)$, may be obtained so that $\psi_{qi}(t) \in C^2$.

The specific function $\mathscr{L}(x,\lambda,v,k)$ is preferably defined by the formula:

$$\mathscr{L}(x, \lambda, v, k) = f(x) - k^{-1} \sum_{i=1}^{p} \lambda_i \psi(k c_i(x)) - \sum_{j=1}^{q} v_j e_j(x) + 0.5k \sum_{j=1}^{q} e_j^2(x)$$

This formula has three parts:
1. An objective function f(x);
2. a nonlinear resealing part:

$$k^{-1}\sum_{i=1}^{p}\lambda_i\psi(kc_i(x)),$$

which corresponds to the inequality constraints; and
3. an augmented Lagrangian part:

$$\sum_{j=1}^{q}v_j e_j(x) + 0.5k\sum_{j=1}^{q}e_j^2(x),$$

which corresponds to equality constraints.

A transformer preferably uses the primal variables $x=(x_1, \ldots, x_n)$, dual variables (Lagrange multipliers) $y=(\lambda, v)$, where: $\lambda=(\lambda_1, \ldots, \lambda_p)$ is a vector of nonnegative components corresponding to inequality constraints; $v=(v_1, \ldots, v_q)$ is a vector with unrestricted components corresponding to equality constraints; and k is a scaling parameter.

Disclosed herein are two iterative solvers: MIN_UPDATE and PRIMAL_DUAL. MIN_UPDATE generates a primal-dual sequence $\{x^s, y^s, k^s\}$ by the following formulas.

$$x^{s+1}: \mathscr{L}(x^{s+1}, \lambda^s, v^s, k^s) = \min_n \mathscr{L}(x, \lambda^s, v^s, k^s),$$

$$\lambda_i^{s+1} = \psi'(kc_i(x^{s+1}))\lambda_i^s, i=1,\ldots,p,$$

$$v_j^{s+1} = v_j^s - ke_j(x^{s+1}), j=1,\ldots,q,$$

$$k^{s+1} := \gamma k^s, \gamma \geq 1.$$

A specific function minimizer for finding $x^{s+1}$ may be based on Newton method for minimizing $\mathscr{L}(x, \lambda^s, v^s, k^s)$ in x. Let $x:=x^s$. By solving the following linear system $$\nabla_{xx}^2 \mathscr{L}(x, \lambda^s, v^s, k^s)\Delta x = -\nabla_x \mathscr{L}(x, \lambda^s, v^s, k^s)$$

for $\Delta x$, the Newton direction may be found. The new approximation $x:=x+t\Delta x$ where the step length $t>0$ may be found by the following procedure.

$t:=1$, $y=(\lambda^s, v^s)$, $k=k^s$, $0<\eta<0.5$.
while $\mathscr{L}(x+t\Delta x, y, k) - \mathscr{L}(x, y, k) \geq \eta t(\nabla_x \mathscr{L}(x, y, k), \Delta x)$ do
begin $$t := \frac{t}{l},$$

$l>1$ end

The minimizer stopping criteria may be defined by the following inequality $$\hat{x}: \|\nabla_x \mathscr{L}(x, \lambda, v, k)\| \leq \alpha(k^{1+\theta})^{-1}\max\{\|\hat{\lambda}-\lambda\|, \|\hat{v}-v\|\}$$

where $a>0$, $0<\theta<0.1$, $\hat{\lambda}_i=\hat{\lambda}_i\psi'(kc_i(\hat{x}))$, $i=1,\ldots,p$; $\hat{v}_j=v_j-ke_j(\hat{x})$, $j=1,\ldots,q$;

The iterative solvers MIN_UPDATE and PRIMAL_DUAL produce the primal-dual sequence $\{x^s, y^s\}$ up to the point when the general stopping criteria is satisfied. To describe the stopping criteria we may first introduce a merit function such as:

$$\mu(x, \lambda, v) = \max\left\{\|\nabla_x L(x, \lambda, v)\|, -\min_{1\leq i\leq p} c_i(x), \max_{1\leq j\leq q}|e_j(x)|, \max_{1\leq i\leq p}|\lambda_i c_i(x)|\right\}.$$

For any $(x, \lambda, y)$ the merit function $\mu(x, \lambda, y) \geq 0$ and $\mu(x, \lambda, v) = 0 \Leftrightarrow x = x^*, \lambda = \lambda^*, v = v^*$.

If $\epsilon > 0$ is the accuracy of solution, then the general stopping criteria may be for the pair (x,y) to satisfy the inequality: $\mu(x, \lambda, y) \leq \epsilon$.

The following pseudo-code describes an embodiment of a Newton Nonlinear Rescaling method as per the present invention.

Input
An accuracy parameter $\epsilon > 0$
Primal $x^0 \in \Re^n$, Dual $\lambda^0 = (1, \ldots, 1)^T \in \Re^m$
Scaling parameter $k > 0$, $\tau > 0$, $0 < \eta < 0.5$
Begin
 $x := x^0$, $\lambda := \lambda^0$, $v := v^0$, $\mu := \mu(x, \lambda, v, k)$
 while $\mu > \epsilon$ do
 begin
  while $\|\nabla_x L(\bar{x}, \lambda, v, k)\| > \tau k^{-1}\min\{\|\text{diag}\psi'(kc_i(\bar{x}))\lambda - \lambda\|, k\|e(\bar{x})\|\}$ do
  begin
   find $\Delta x: \nabla_{xx}\mathscr{L}(x, \lambda, v, k)\Delta x = -\nabla_x \mathscr{L}(x, \lambda, v, k)$
   $t := 1$
   while $\mathscr{L}(x+t\Delta x, \lambda, v, k) - \mathscr{L}(x, \lambda, v, k) > \eta t(\nabla_x \mathscr{L}(x, \lambda, v, k), \Delta x)$ do
    $t := t/2$
   $x := x + t\Delta x$
  end
  $\lambda_i := \psi'(kc_i(x))\lambda_i$, $i=1,\ldots,p$; $v_j := v_j - ke_j(x)$, $j=1,\ldots,q$
  $\mu := \mu(x, \lambda, v, k)$
 end
end Output $x, \lambda, v, \mu$ The iterative solver MIN_UPDATE may be based on Newton's method for minimization of the specific function L(x,y,k) in x followed by the Lagrange multipliers update.

Another iterative solver PRIMAL_DUAL may be based on solving a primal-dual system. Unconstrained minimization of the specific function and updating of the Lagrange multipliers may be equivalent to solving the following primal-dual system of equations for $\hat{x}$ and $\hat{y} = (\hat{\lambda}, \hat{v})$ $$\nabla f(\hat{x}) - \sum_{i=1}^{p}\hat{\lambda}_i \nabla c_i(\hat{x}) - \sum_{j=1}^{q}\hat{v}_j \nabla e_j(\hat{x}) = 0$$

$$\hat{\lambda}_i = \psi'(kc_i(\hat{x}))\lambda_i, i=1,\ldots,p$$

$$\hat{v}_j = v_j - ke_j(\hat{x}), j=1,\ldots,q$$

Newton's method may be performed as part of solving the primal-dual system for $(\hat{x}, \hat{y})$. After linearizing the system for $(\hat{x},\hat{y})=(\hat{x},\hat{\lambda},\hat{v})$, the following linear system of equations for finding the primal-dual Newton direction $(\Delta x,\Delta y)=(\Delta x, \Delta\lambda,\Delta v)$ may be obtained.

$$\nabla_{xx}^2 L(x,y)\Delta x - \nabla c(x)^T \Delta\lambda - \nabla e(x)^T \Delta v = -\nabla_x L(x,y) \quad (4)$$

$$-k\Lambda\Psi''(kc(x))\nabla c(x)\Delta x + \Delta\lambda = \bar{\lambda} - \lambda \quad (5)$$

$$k\nabla e(x)\Delta x + \Delta v = \bar{v} - v \quad (6)$$

where $\bar{y}=(\bar{\lambda},\hat{v})$, $\bar{\lambda}_i=\psi'(kc_i(x))\lambda$, $i=1, \ldots, p$, $\bar{v}_j=v_j-ke_j(\bar{x})$, $j=1, \ldots, q$ $\Lambda=\text{diag}(\lambda_i)_{i=1}^p$, $\Psi'(kc(x))=\text{diag}(\psi'(kc_i(x)))_{i=1}^p$, $\Psi''(kc_i(x))=\text{diag}(\psi''(kc_i(x)))_{i=1}^p$, $\nabla c(x)$ is Jacobian of vector function $c(x)=(c_1(x), \ldots, c_p(x))^T$ and $\nabla e(x)$ is Jacobian of vector function $e(x)=(e_1(x), \ldots, e_q(x))^T$ System (4)–(6) may be rewritten as follows:

$$\begin{bmatrix} \nabla_{xx}^2 L(x,y) & -\nabla c(x)^T & -\nabla e(x)^T \\ -\nabla c(x) & (k\wedge\Psi''(kc(x)))^{-1} & 0 \\ -\nabla e(x) & 0 & -k^{-1}I_q \end{bmatrix} \begin{bmatrix} \Delta x \\ \Delta\lambda \\ \Delta v \end{bmatrix} = \begin{bmatrix} -\nabla_x L(x,y) \\ (k\wedge\Psi''(kc(x)))^{-1}(\bar{\lambda}-\lambda) \\ -k^{-1}(\bar{v}-v) \end{bmatrix} \quad (7)$$

The matrix on the left hand side is symmetric and usually sparse. It may allow solving the system efficiently using modern linear algebra technique. Also, system (4) and (5) may be used to find $\Delta\lambda$ and $\Delta v$. After substituting $\Delta\lambda$ and $\Delta v$ into (4), the following system for finding the primal Newton direction $\Delta x$ may be obtained.

$$(\nabla_{xx}^2 L(x,y)+zI-k\nabla c(x)^T\Lambda\Psi''(kc(x))\nabla c(x)+k\nabla e(x)^T\nabla e(x))\Delta x = -\nabla_x L(x,\bar{y}) \quad (8)$$

where parameter $z\geq 0$. Matrix $$M(x,y,k)=\nabla_{xx}^2 L(x,y)+zI-k\nabla c(x)^T\Lambda\Psi''(kc(x))\nabla c(x)+k\nabla e(x)^T\nabla e(x)$$

is symmetric, positive semi-definite for $z\geq 0$ and positive definite for $z>0$. The Newton direction $\Delta\lambda$ for the Lagrange multipliers associated with the inequality constraints may be found by formula $$\Delta\lambda = k\Lambda\Psi''(kc(x))\nabla c(x)\Delta x - \lambda + \bar{\lambda} \quad (9)$$

The Newton direction $\Delta v$ for the Lagrange multipliers associated with the equality constraints may be found by formula $$\Delta v = -k\nabla e(x)\Delta x + \bar{v} - v \quad (10)$$

So one step of the PRIMAL_DUAL iterative algorithm may include:

1. Finding the dual predictor for the Lagrange multipliers associated with the inequality constraints by formulas $$\bar{\lambda}_i = \psi'(kc_i(x))\lambda, i=1,\ldots,p$$

2. Finding the dual predictor for the Lagrange multipliers associated with the equality constraints by formulas $$\bar{v}_j = v_j - ke_j(\bar{x}), j=1,\ldots,q$$

3. Finding the primal corrector $\Delta x$ by solving the system (8).
4. Finding the dual corrector $\Delta\lambda$ associated with the inequality constraints by formula (9).
5. Finding the dual corrector $\Delta v$ associated with the equality constraints by formula (10).
6. Finding the new primal-dual variables by formulas (primal-dual updater):
   a) primal: $x:=x+\Delta x$.
   b) new Lagrange multipliers associated with the inequality constraints:

$$\lambda:=\lambda+\Delta\lambda=\bar{\lambda}+k\Lambda\Psi''(kc(x))\nabla c(x)\Delta x$$

c) new Lagrange multipliers associated with the equality constraints:

$$v:=v+\Delta v=\bar{v}-k\nabla e(x)\Delta x$$

7. Updating the scaling parameter by formula $$k:=\max\{k\gamma, \mu(x,\lambda,v)^{-\delta}\}, \delta>0, \gamma\geq 1$$

We will now discuss an embodiment of the present invention which solves Power Flow Optimization Problems and general constrained optimization problems using a Newton Modified Barrier-Augmented Lagrangian algorithm. This example is a particular embodiment of the present invention in which the Nonlinear Rescaling Lagrangian is the Newton Modified Barrier-Augmented Lagrangian. This example is presented purely for illustrative purposes of this particular embodiment. One skilled in the art will recognize that this embodiment is only illustrative of how the present invention may be used and not inclusive of all embodiments. It is not intended that the present invention be limited to or any specific embodiment.

The electrical utilities worldwide seek cost effective means to increase the operational efficiency of their transmission networks. Two research areas are of great interests for power system analysis: the study of voltage collapse and Optimal Power Flow (OPF) solutions. One of the OPF criteria is loadability limit of the power system. The purpose is to find such OPF, which maximize the loadability. The other possible criteria is the cost of power restoration in case of voltage collapse. The third area of great interest is to find such transformers tap positions that the system may withstand light and peak load.

All these problems may be solved using OPF, a static Nonlinear Optimization (NLP) problem with both inequality constraints and equations. These problems may be defined by a set of physical and operational constraints imposed by equipment limitation and security requirement. Among variables are bus voltages, bus angles, real and reactive generation tap settings of transformers etc. The constraints may include Kirghoff equations, upper and lower bounds for particular variables, as well as limitations imposed by security requirements.

Electric network is operating heavily loaded systems, therefore planning and operation tools preferably address strong nonlinearities in the system's behavior.

Over the last three decades OPF methods used different mathematical programming technique: sequential linear programming, and Newton's based NLP methods. In the last decade, it became very popular to use a different version of the Interior Point Methods (IPM).

The present embodiment of the present invention uses a new approach for constrained optimization problems with both inequality constraints and equations, which is based on Modified Barrier and Augmented Lagrangian (MBAL) theory. This MBAL theory [1] provides the basic framework for the algorithms, which we used to solve the OPF problems, which arise in the first phase of our research.

We start with a general description of the MBAL method.

Let $f$, $c_i$ and $d_j$ are smooth enough functions. We consider the following problem $$x^* \in X^* = \text{Arg min } \{f(x) | c_i(x) \geq 0, i=1, \ldots, p; d_j(x)=0, j=1, \ldots, q\}. \quad (1)$$

Since the mid 80s the Interior Point Methods (IPMs) became the most popular tool for solving constrained optimization problems with inequality constraints. The IPMs not only have become the mainstream in the Optimization Community, but also have been widely used in applications and in particular for solving OPF problems [4].

The IPMs for Linear Programming (LP) calculations is a great success story (see [8]).

The situation in Nonlinear Optimization (NLP) is not as bright as in LP. Although the Primal-Dual IPM [7] produced reasonable results for a number of NLP, the ill conditioning, which is typical for the Barrier and Penalty methods, remains a serious issue. The unbounded increase of the barrier parameter, which is the only tool to control the computational process in the IPM calculations, leads to the unbounded increase of the condition number of the correspondent Hessian. So the area, where Newton's method is well-defined shrinks to zero. Therefore to stay in the Newton area one has to increase the barrier parameter very careful. It leads to slow convergence. More drastic increase of the barrier parameter leads to numerical instability.

In LP calculations the ill-conditioning phenomenon was possible to avoid due to the special structure of the correspondent Hessian as well as substantial advances in the numerical linear algebra [5].

In the NLP the structure of the Classical Barrier Function Hessian is fundamentally different than in LP. Therefore there is a substantial gap between efficiency of the IPM for LP and NLP calculations.

The problems, which the electric power industry faces, are nonlinear and large scale by nature.

The OPF problems along with inequality constraints have equations. Therefore it is hard to expect that the IPM may be used efficiently in particular in case of nonlinear equality constraints. Also the ill conditioning effect is much more troubling in NLP calculations than in LP.

Hence there is a need for new mathematical approaches, which may deal with large scale OPF, successfully handle both equations and inequality constraints and avoid the ill-conditioning effect. But, most of all the methods have to be fast and numerically stable.

In the following we describe such an approach, which is based on the Modified Barrier Function (MBF) [2] and Augmented Lagrangian (AL) [6] theories.

The MBF approach may eliminate the basic problems related to the Classical Log-Barrier functions for inequality constraints, whereas the AL eliminates the basic problems associated with the penalty type functions for equality constraints.

By applying the MBF methodology [2] for inequality constraints and by treating the equations with Augmented Lagrangian term [6] we may obtain the MBAL, which is our main tool for solving problem (1). The MBAL function $\mathscr{L}: \mathfrak{R}^n \times \mathfrak{R}_+^p \times \mathfrak{R}^q \times \mathfrak{R}_+ \to \mathfrak{R}$ is given by formula $$\mathscr{L}(x, \lambda, v, k) = f(x) - k^{-1} \sum_{i=1}^{p} \lambda_i \ln(kc_i(x)+1) - \sum_{i=1}^{q} v_i d_i(x) + 0.5k \sum_{i=1}^{q} d_i^2(x)$$

The function was introduced in [1]. The first two terms represent the Lagrangian for the equivalent problems in the absence of the equality constraints, because for any fixed $k>0$ the system $\ln(kc_i(x)+1) \geq 0$, $i=1, \ldots, p$ is equivalent to $c_i(x) \geq 0$, $i=1, \ldots, p$.

The last two terms represent the Augmented Lagrangian for equality constraints [6]. Along with the Classical Lagrangian term $$-\sum_{i=1}^{q} v_i d_i(x)$$

there is a penalty part $$0.5k \sum_{i=1}^{q} d_i^2(x),$$

which is design to penalize the violation of the equality constraints. Keeping in mind that the MBF function $$F(x, \lambda, k) = f(x) - k^{-1} \sum_{i=1}^{p} \lambda_i \ln(kc_i(x)+1)$$

has all the characteristics of the Interior Augmented Lagrangian (see [2]), the MBAL $\mathscr{L}(x,\lambda,v,k)$ may be viewed as Interior-Exterior Augmented Lagrangian.

Before we will describe the MBAL multipliers method we would like to emphasize a few important characteristics of the MBAL at the primal-dual solution.

In contrast to the Classical Barrier Function, the MBF exists at the solution together with its derivatives of any order. Moreover for any $k>0$ MBAL possesses the following important properties at the primal-dual solution.

10. $\mathscr{L}(x^*,\lambda^*,v^*,k) = f(x^*)$.

20. $\nabla_x \mathscr{L}(x^*,\lambda^*,v^*,k) = \nabla_x L(x^*,\lambda^*,v^*) = 0$, where $$L(x, \lambda, v) = f(x) - \sum_{i=1}^{p} \lambda_i c_i(x) - \sum_{i=1}^{q} v_i d_i(x)$$

is the Classical Lagrangian for the original problem (1).

30.

$$\nabla_{xx}^2 \mathscr{L}(x^*,\lambda^*,v^*,k) = \nabla_{xx}^2 L(x^*,\lambda^*,v^*) + k\nabla c^T(x^*)\Lambda^* \nabla c(x^*) + k\nabla d^T(x^*)\nabla d(x^*),$$

where $\nabla c(x) = J(c(x))$ and $\nabla d(x) = J(d(x))$ are Jacobians of $c(x)$ and $d(x)$.

So the MBAL not only exists at the primal-dual solution together with its derivatives of any order but for $\lambda = \lambda^*$ and $v = v^*$ the MBAL is the exact smooth approximation of a nonsmooth function, minimum of which coincides with $x^*$.

Also under the standard second order optimality conditions for (1) the MBAL Hessian $\nabla_{xx}^2 \mathscr{L}(x^*,\lambda^*,v^*,k)$ is positive definite independently from convexity of $f$, $c_i$, $d_j$ for any $k \geq k_0 > 0$ if $k_0$ is large enough.

Therefore for any pair $(\lambda,v)$ close enough to $(\lambda^*,v^*)$ the MBAL $\mathscr{L}(x,\lambda,v,k)$ is strongly convex in x no matter whether the objective function and the constraints are convex or not. Keeping in mind the smoothness of $\mathscr{L}(x,\lambda v,k)$ in $x\in\mathfrak{R}^n$ we may expect that Newton's method for primal minimization MBAL will be efficient.

The MBAL method generates the primal-dual sequence $\{x^s,\lambda^s,v^s\}$ while $k>0$ may be fixed or one may change $k>0$ from step to step. We will describe the MBAL method under the fixed barrier-penalty parameter, $k>0$.

For any $x^0\in\mathfrak{R}^n$ one may find $k>0$ such that $kc_i(x^0)+1>0$ Hence, the numerical realization of the MBAL method in contrast to IPM does not require finding initial interior point. The initial dual approximation is not an issue either, so we may take $\lambda^0=e\in\mathfrak{R}^p$ and $v^0\in\mathfrak{R}^q$ as an initial approximation for dual vectors. We assume ln $t=-\infty$, $t\leq 0$.

Let's assume that $(x^s,\lambda^s,v_s)$ has been already found. The next approximation we find by formulas $$x^{s+1}=\arg\min\{\mathscr{L}(x,\lambda^s,v^s,k)|x\in\mathfrak{R}^n\} \quad (2)$$

i.e.

$$x^{s+1}:\nabla_x\mathscr{L}(x^{s+1},\lambda^s,v^s,k)=0 \quad (3)$$

or $$\nabla f(x^{s+1}) - \sum_{i=1}^{p} \frac{\lambda_i^s}{kc_i(x^{s+1})+1}\nabla c_i(x^{s+1}) - \quad (4)$$

$$\sum_{j=1}^{q}(v_j^s - kd_j(x^{s+1}))\nabla d_j(x^{s+1}) =$$

$$\nabla f(x^{s+1}) - \sum_{i=1}^{p}\lambda_i^{s+1}\nabla c_i(x^{s+1}) - \sum_{j=1}^{q}\lambda_j^{s+1}\nabla d_j(x^{s+1}) =$$

$$\nabla_x L(x^{s+1}, \lambda^{s+1}, v^{s+1})$$

The new Lagrange multipliers may be found by formulas $$\lambda_i^{s+1}=\lambda_i^s(kc_i(x^{s+1})+1)^{-1}, i=1,\ldots,p \quad (5)$$

$$v_j^{s+1}=v_j^s-kd_j(x^{s+1}), j=1,\ldots,q \quad (6)$$

In other words the Lagrange multipliers for inequality constraints we update as in MBF method [2] while the Lagrange multipliers, which correspond the equality constraints, we update as in Augmented Lagrangian methods [6].

The convergence of the MBAL method is just due to the Lagrange multipliers update while $k>0$ may be fixed, so the condition number of the MBAL Hessian remains stable and the area where Newton's method for the primal minimization converges does not shrink to a point. So we may expect that the area where Newton's method is "well defined" will remain large enough up to the end of the computational process.

It makes the computation process robust and eventually produces very accurate results.

So MBAL is an exterior point method in primal, because $x^s$ usually does not satisfy neither the primal inequality nor the equations.

It was proven in [1] that both the primal sequence and the dual sequence $\{y^s\}=\{\lambda^s,v^s\}$ converges to the primal-dual solution under the standard second order optimality conditions. Moreover the rate of convergence are Q-linear, i.e. for primal $\{x^s\}$ and dual $\{y^s\}=\{\lambda^s, v^s\}$ sequences, which were generated by formulas (3)-(6) the following estimation takes place $$\|x^{s+1}-x^*\|\leq\frac{c}{k}\|y^s-y^*\|, \|y^{s+1}-y^*\|\leq\frac{c}{k}\|y^s-y^*\|,$$

where $c>0$ is independent of $k\geq k_0>0$ and $k_0>0$ is large enough.

Each step has two basic components: unconstrained minimization of the MBAL $\mathscr{L}(x,\lambda^s,v^s,k)$ in x under fixed vector of Lagrange multipliers $y^s=(\lambda^s,v^s)$ and fixed scaling parameter $k>0$ and update by (5)–(6) of the Lagrange multipliers, using the unconstrained minimizer $x^{s+1}$.

In the next section we describe the Newton MBAL algorithm, which uses Newton's method with the step length for unconstrained minimization and introduce a stopping criteria for the unconstrained minimization, which makes the algorithm practical.

We will now provide a formal description of the Newton MBAL algorithm. To make the MBAL method practical we have to replace the infinite procedure of finding the primal minimizer by a finite procedure. It may be done by introducing well grounded stopping criteria for the primal minimization.

To satisfy the stopping criteria we may use Newton's method with step length for finding an approximation for $$\hat{x}=\arg\min\{\mathscr{L}(x,\lambda,v,k)|x\in\mathfrak{R}^n\}$$

or we may use Newton's method for solving the primal-dual system.

The first direction leads to Newton's MBAL, the second leads to the Primal-Dual MBAL method.

The stopping criteria is based on comparison the norm of the gradient $\nabla_x\mathscr{L}(x,\lambda,v,k)$ with the norm of the difference between the new and old Lagrange multipliers. Let $\tau>0$ be a chosen parameter. Let us assume that for $x\in\mathfrak{R}^n$ the following inequality is satisfied $$\|\nabla_x\mathscr{L}(\bar{x},\lambda,v,k)\|\leq \tau k^{-1}\min\{\|diag(kc_i(\bar{x})+1)^{-1}\lambda-\lambda\|, k\|d(\bar{x})\|\} \quad (7)$$

then for the pair of vectors $(\bar{x},\bar{y})$, where $\bar{y}=(\bar{\lambda},\bar{v})$, $\bar{\lambda}=(kC(\bar{x})+I)^{-1}\lambda$, $\bar{v}=v-kd(\bar{x})$ the following bound $$\max\{\|\bar{x}-x^*\|,\|\bar{y}-y^*\|\}\leq\frac{c(1+\tau)}{k}\|y-y^*\|$$

holds true. The formula (7) is the foundation for the numerical realization of the MBAL method. We start with $x^0\Delta\Omega_k=\{x:kc_i(x)+1\geq 0, i=1,\ldots,p\}, \lambda^0=e\in\mathfrak{R}_{++}^p$ and $v^0\in\mathfrak{R}^q$. Let us assume that pair $(\bar{x}^s,\bar{y}^s)$ has been found already. The next approximation $(\bar{x}^{s+1},\bar{y}^{s+1})$ we find by the following operations:

1. Find $$\bar{x}^{s+1}: \|\nabla_y\mathscr{L}(x^{s+1},\bar{x}^s\bar{v}^s,k)\|\leq \tau k^{-1}\min\left\{\left\|diag(kc_i(\bar{x}^{s+1})+1)^{-1}\bar{x}^s-\bar{\lambda}^s\right\|, k\|d(\bar{x}^{s-1})\|\right\} \quad (8)$$

2. Find new Lagrange multipliers $$\bar{\lambda}_i^{s+1}=(kc_i(\bar{x}^{s+1})+1)^{-1}\bar{\lambda}_i^s, i=1,\ldots,p$$

$$\bar{v}_j^{s+1}=\bar{v}_j^s-kd_j(\bar{x}^{s+1}), j=1,\ldots,q$$

To find the approximation for the primal minimizer $\bar{x}^{s+1}$ we used Newton's method with step-length for minimizing $\mathscr{L}(x,\bar{\lambda}^s,\bar{v}^s, k)$ in x. In other words the primal Newton's direction $\Delta x$ we find from the following system $$\nabla_{xx}\mathscr{L}(x,\bar{\lambda}^s,\bar{v}^s,k)\Delta x = -\nabla_x \mathscr{L}(x, \bar{\lambda}^s,\bar{v}^s, k) \qquad (9)$$

The Hessian $\nabla_{xx}\mathscr{L}(x,\bar{\lambda}^s,\bar{v}^s,k)$ we compute by formula $$\nabla_{xx}\mathscr{L}(x,\bar{\lambda}^s,\bar{v}^s,k) = \nabla_{xx}L(x,\bar{\lambda}^s,\bar{v}^s) + k\nabla c(x)^T$$
$$\bar{\lambda}^s(kC(x)+I)^{-1}\nabla c(x) + k\nabla d^T(x)\nabla d(x)$$

where $\bar{\lambda}^{s+1} = (kC(\bar{x}^{s+1})+I)^{-1}\bar{\lambda}^s$, $\bar{v}^{s+1} = \bar{v}^s - kd(\bar{x}^{s+1})$, $(kC(x)+I) = \text{diag}(kc_i(x)+1)_{i=1}^p$.

The gradient $\nabla_x\mathscr{L}(x,\bar{\lambda}^s,\bar{v}^s,k) = \nabla_x L(x,\bar{\lambda}^{s+1}, \bar{v}_{s+1})$.

The numerical realization of the MBAL leads to Newton's MBAL method.

The Newton's MBAL method consists of using Newton's method with steplength for minimization of $\mathscr{L}(x,\bar{\lambda}^s,\bar{v}^s,k)$ in $x \in \mathfrak{R}^n$ following by the Lagrange multipliers update using approximation $\bar{x}^{s+1}$, which satisfies the criteria (8). The chart below describes Newton NR method.

We will first introduce a merit function, which may measure the violation of the optimality condition.

Let us define the merit function $\mu: \mathfrak{R}^n \times \mathfrak{R}_+^p \times \mathfrak{R}^q \times \mathfrak{R}_{++}^1 \to \mathfrak{R}^1$ by the following formula $$\mu(\cdot) = \mu(x, \lambda, v, k) = \max\left\{-\min_{1 \le i \le p} c_i(x), \max_{1 \le j \le q} |d_j(x)|,\right.$$
$$\left. \|\nabla \mathscr{L}(x, \lambda, v, k)\|, \sum_{i=1}^p \lambda_i|c_i(x)|, \sum_{i=1}^q |v_i||d_i(x)|,\right\}$$

It is easy to see, that for any k>0 the function $\mu(\cdot)$ is nonnegative and $$\mu(x,\lambda,v,k) = 0 \text{ iff } x = x^*, \lambda = \lambda^*, v = v^*$$

Input
  An accuracy parameter $\epsilon > 0$
  Primal $x^0 \in \mathfrak{R}^n$, Dual $\lambda^0 = (1, \ldots, 1)^T \in \mathfrak{R}^m$
  Scaling parameter k>0, $\tau$>0, 0<$\eta$<0.5
Begin
  $x := x^0$, $\lambda := \lambda^0$; $v := v^0$, $\mu := \mu(x,\lambda,v,k)$
  while $\mu > \epsilon$ do
  begin
    while $$\|\nabla_x \mathscr{L}(x, \lambda, v, k)\| > \tau k^{-1}\min\{\|\text{diag}(kc_i(\bar{x}) + 1)^{-1}\lambda - \lambda\|, k\|d(\bar{x})\|\}$$

do
    begin
      find $\Delta x: \nabla_{xx}\mathscr{L}(x,\lambda,v,k)\Delta x = -\nabla_x\mathscr{L}(x,\lambda,v,k)$
      t:=1
      while $\mathscr{L}(x+t\Delta x,\lambda,v,k) - \mathscr{L}(x,\lambda,v,k) > \eta t(\nabla_x\mathscr{L}(x,\lambda,v,k),\Delta x)$ do
        t:=t/2
      $x := x + t\Delta x$
    end
    $\lambda_i := (1+kc_i(x))^{-1}$, i=1, ..., p; $v_j := v_j - kd_j(x)$, j=1, ..., q
    $\mu := \mu(x,\lambda,v,k)$
  end
end Output $x,\lambda,v,\mu$ As we may see from the MBAL algorithm the most costly operation is finding Newton's direction. It requires solving system (9). The dimension of the primal space defines the size of the system. Therefore the dimension of the primal space is much more important than the number of constraints both inequalities and equations.

The most time consuming part is the first few MBAL primal minimizations. After few Lagrange multipliers update the Primal optimization does not require much effort, because the Lagrange multipliers become close to their optimal value.

The main task of the proposed research is to improve the first phase of the Newton MBAL. The second task is to find an optimal strategy for the penalty barrier parameter k>0 update, which allows to reach the "hot start" as soon as possible.

From "hot start" on, it requires very few and often even one Newton's step for the Lagrange multipliers update, which reduces the distance between the primal-dual approximation to the primal-dual solution by a factor $\gamma = ck^{-1}$, where c>0 is independent on $k \ge k_0$. It happens because Newton's area, i.e. the area where Newton's method is "well defined" [2] does not shrink to a point, it remains stable when the primal dual approximation approaches the primal-dual solution. It distinguishes fundamentally the MBAL approach from the IPM or penalty type methods.

The following references are included in this specification by reference to provide support for the state of art relied upon in describing the present invention.

[1] D. Goldfarb, K. Mints, R. Polyak, I. Yuzefovich, Modified Barrier-Augmented Lagrangian Method for Constrained Minimization, Computational Optimization and Applications, 14, p 55-74, 1999.

[2] R. Polyak, Modified Barrier Functions, Mathematical Programming 54 (1992) 177-222 North-Holland.

[3] S. Nash and J. Nacedal, A numerical study of the limited memory BFGS method and the truncated-Newton method for large Scale Optimization, SIAM Journal on Optimization 1 (1991) pp. 358-372.

[4] I. Nejdawi, K. Clements, P. Davis, An Efficient Interior Point Method for Sequential Quadratic Programming Based on Optimal Power Flow, IEEE Transactions on Power Systems, 15(4), 1179-1183, 2000.

[5] E. Ng, B. W. Peyton, Block sparse Cholesky algorithms on advanced uniprocessor computers, SIAM Journal of Scientific Computing, 14 (1993), pp. 1034-1056.

[6] M. J. D. Powell, A method for nonlinear constraints in minimization problems, Optimization, Ed. Fletcher, London, Acad. Press, 1969, 283-298.

[7] R. Vandebei, D. Shanno, An interior point algorithm for nonconvex nonlinear programming, Computational Optimization and Applications 13, 231-252,1999.

[8] S. Wright, Primal-Dual Interior Points methods, SIAM, 1997.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A tangible computer readable medium containing a computer program comprising:
   a) a mathematical formulation describing a constrained optimization problem for a physical system; said mathematical formulation including:
      i) variables $x=(x_1, \ldots, x_n)$;
      ii) an objective function $f(x)$; and
      iii) at least one constraint selected from the group consisting of:
         (1) an inequality constraint $c_i(x) \geq 0$, $i=1, \ldots, p$; and
         (2) an equality constraint $e_j(x)=0$, $j=1, \ldots, q$;
   b) a class of transformation functions with a predefined set of properties;
   c) Lagrange multipliers $\lambda=(\lambda_1, \ldots, \lambda_p)$, $v=(v_1, \ldots, v_q)$
   d) a scaling parameter k;
   e) a transformer capable of building a specific function $L(x,\lambda,v,k)$ from said mathematical formulation, said Lagrange multipliers and said scaling parameter using said class of transformation functions, said specific function including $$f(x) - k^{-1} \sum_{i=1}^{p} \lambda_i \psi(kc_i(x)) - \sum_{j=1}^{q} v_j e_j(x) + 0.5 \sum_{i=1}^{q} k e_i^2(x);$$

f) a Lagrange multipliers updater capable of calculating updated Lagrange multipliers $\hat{\lambda}=(\hat{\lambda}_1, \ldots, \hat{\lambda}_m)$, $\hat{v}=(\hat{v}_1, \ldots, \hat{v}_q)$;
   g) a scaling parameter updater capable of calculating an updated scaling parameter $\hat{k}$;
   h) a merit function calculator capable of calculating a merit function $\mu(x,\lambda,v)$;
   i) a general stopping criteria verifier;
   j) an accuracy of solution parameter ($\epsilon$); and
   k) an iterative solver capable using said specific function, said Lagrange multipliers updater and said scaling parameter updater to generate a solution; and
   wherein said solution is applied to said physical system.

2. A medium according to claim 1, wherein said predefined set of properties includes:
   i) $\psi(t):\mathfrak{R}^1 \to \mathfrak{R}^1$ defined on $-\infty \leq a < t < b \leq \infty$;
   ii) $\psi(0)=0$;
   iii) $\psi'(0)=1$;
   iv) $\psi'(t)>0$;
   v) $\psi''(t)<0$; and
   vi)
   $$\lim_{t \to b} \psi'(t) = 0.$$

3. A medium according to claim 2, wherein said predefined set of properties further includes:
   i) $\psi''(t)<0$; and
   ii)
   $$\lim_{t \to b} \psi'(t) = 0.$$

4. A medium according to claim 2, wherein said inequality constraint is $c_i(x) \leq 0$; $i=1, \ldots, p$ and said predefined set of properties further includes:
   i) $\psi''(t)>0$; and
   ii)
   $$\lim_{t \to a} \psi'(t) = 0.$$

5. A medium according to claim 1, wherein said mathematical formulation includes said objective function being minimized, subject to said inequality constraints and said equality constraints.

6. A medium according to claim 1, wherein said Lagrange multipliers updater includes Lagrange multipliers update formulas.

7. A medium according to claim 6, wherein said Lagrange multipliers update formulas include $\hat{\lambda}_i = \lambda_i \psi'(kc_i(\hat{x}))$, $i=1, \ldots, p$.

8. A medium according to claim 6, wherein said Lagrange multipliers update formulas include $\hat{v}_j = v_j - k e_j(\hat{x})$, $j=1, \ldots, q$.

9. A medium according to claim 1, wherein said scaling parameter updater includes scaling parameter update formula $$\hat{k} = \max\{k\gamma, \mu(\hat{x},\hat{\lambda},\hat{v})^{-\delta}\}, \delta > 0, \gamma \geq 1.$$

10. A medium according to claim 1, wherein said iterative solver includes a general stopping criteria verifier for determining when said iterative solver should terminate.

11. A medium according to claim 1, wherein said iterative solver includes a general stopping criteria verifier uses a general stopping criteria.

12. A medium according to claim 10, wherein said general stopping criteria verifier uses said accuracy of solution parameter.

13. A medium according to claim 12, wherein said general stopping criteria verifier considers when said merit function is equal or less than said accuracy of solution parameter.

14. A medium according to claim 1, wherein said iterative solver is a MIN_UPDATE solver.

15. A medium according to claim 1, wherein said iterative solver is a PRIMAL_DUAL solver.

16. A medium according to claim 14, wherein said MIN_UPDATE solver includes:
   a) a specific function minimizer for performing an unconstrained minimization in variables of said specific function with determined said Lagrange multipliers and said scaling parameter; said specific function minimizer capable of producing updated variables;
   b) a minimizer stopping criteria checker for determining when said specific function minimizer should terminate;
   c) said Lagrange multipliers updater for calculating said updated Lagrange multipliers using said updated variables, said Lagrange multipliers and said Lagrange multipliers update formula;
   d) said scaling parameter updater for calculating said updated scaling parameter using said updated variables, said updated Lagrange multipliers, said scaling parameter and said scaling parameter update formula; and
   e) said general stopping criteria verifier.

17. A medium according to claim 16, wherein said specific function minimizer uses a Newton's method.

18. A medium according to claim 16, wherein said MIN_UPDATE solver further includes an accuracy of minimizer parameter ($\epsilon_m$) and a minimizer stopping criteria uses said accuracy of minimizer parameter.

19. A medium according to claim 16, wherein said updated variables ($\hat{x}$) must satisfy a minimizer stopping criteria.

20. A medium according to claim 16, wherein said scaling parameter updater uses said merit function.

21. A medium according to claim 16, wherein a minimizer stopping criteria includes at least one of the following selected from the group consisting of:

a) said updated variables;
b) said Lagrange multipliers;
c) said scaling parameter;
d) said updated Lagrange multipliers; and
e) a stopping inequality verifier.

22. A medium according to claim 21, wherein said stopping inequality verifier is select from the group consisting of:

a) $\hat{x} : \|\nabla_x L(\hat{x}, \lambda, v, k)\| \le \varepsilon_m$; and b) $\hat{x} : \|\nabla_x L(\hat{x}, \lambda, v, k)\| \le \alpha(k^{1+\theta})^{-1} \max\{\|\hat{\lambda} - \lambda\|, \|\hat{v} - v\|\}$,
$\alpha > 0, 0 < \theta < 0.1$.

23. A medium according to claim 15, wherein said PRIMAL_DUAL solver includes:
a) a primal-dual system of equations, including:
i) a gradient of classical Lagrangian $$\nabla f(x) - \sum_{i=1}^{p} \lambda_i \nabla c_i(x) - \sum_{j=1}^{q} v_j \nabla e_j(x);$$

and
ii) said Lagrange multipliers update formulas;
b) a linear system for Newton directions;
c) a predictor-corrector algorithm for solving said linear system for Newton directions; and
d) said scaling parameter update formula.

24. A medium according to claim 23, wherein said gradient of classical Lagrangian equals zero.

25. A medium according to claim 23, wherein said predictor-corrector algorithm includes:
a) inequality predictors ($\overline{\lambda}$) for said Lagrange multipliers associated with inequality constraints;
b) equality predictors ($\overline{v}$) for said Lagrange multipliers associated with equality constraints;
c) a primal corrector ($\Delta x$);
d) a primal linear system for finding said primal corrector;
e) inequality correctors ($\Delta\lambda$) for said Lagrange multipliers associated with inequality constraints;
f) equality correctors ($\Delta v$) for said Lagrange multipliers associated with equality constraints; and
g) a primal-dual updater.

26. A tangible computer readable medium containing a computer program, the computer program implementing a method for finding a solution to a constrained optimization problem for a physical system, the method comprising the steps of:
a) defining a mathematical formulation describing said problem; said mathematical formulation including:
i) variables $x=(x_1, \ldots, x_n)$;
ii) an objective function $f(x)$;
iii) inequality constraints $c_i(x) \ge 0$, $i=1, \ldots, p$; and
iv) equality constraints $e_j(x)=0$, $j=1, \ldots, q$;

b) selecting initial Lagrange multipliers $\lambda=(\lambda_1, \ldots, \lambda_p)$, $v=(v_1, \ldots, v_q)$;
c) selecting an initial scaling parameter k;
d) selecting initial variables $x=(x_1, \ldots, x_n)$;
e) building a specific function $L(x,\lambda,v,k)$ from said mathematical formulation, said initial Lagrange multipliers and said initial scaling parameter using an element of a class of transformation functions having a predefined set of properties, said specific function further includes $$f(x) - k^{-1} \sum_{i=1}^{p} \lambda_i \psi(kc_i(x)) - \sum_{j=1}^{q} v_j e_j(x) + 0.5 \sum_{j=1}^{q} k e_j^2(x);$$

f) performing a nonlinear resealing augmented Lagrangian iterative algorithm; and
g) applying said solution to said physical system.

27. The medium according to claim 26, wherein said step of performing a nonlinear resealing augmented Lagrangian iterative algorithm includes iteratively:
a) performing a minimization of said specific function;
b) calculating updated Lagrange multipliers $\hat{\lambda}=(\hat{\lambda}_1, \ldots, \hat{\lambda}_m)$, $\hat{v}=(\hat{v}_1, \ldots, \hat{v}_q)$;
c) calculating an updated scaling parameter $\hat{k}$;
d) calculating a merit function $\mu(x,\lambda,v)$; and
e) stopping iterations when a general stopping criteria using an accuracy of solution parameter ($\epsilon$) is satisfied.

28. The medium according to claim 26, wherein said step of performing a nonlinear resealing augmented Lagrangian iterative algorithm (PRIMAL_DUAL) includes iteratively:
a) solving a primal-dual system of equations, said primal-dual system of equations including:
i) a gradient of classical Lagrangian $$\nabla f(x) - \sum_{i=1}^{p} \lambda_i \nabla c_i(x) - \sum_{j=1}^{q} v_j \nabla e_j(x);$$

and
ii) said Lagrange multipliers update formulas;
b) solving a linear system for Newton directions;
c) performing a predictor-corrector algorithm for solving said linear system for Newton directions;
d) updating primal dual variables; and
e) updating said initial scaling parameter.

29. A medium according to claim 1, wherein said physical system is an electrical transmission network.

30. A medium according to claim 26, wherein said physical system is an electrical transmission network.

* * * * *